(12) United States Patent
Emtman et al.

(10) Patent No.: US 8,456,637 B2
(45) Date of Patent: Jun. 4, 2013

(54) MULTIPLE MEASURING POINT CONFIGURATION FOR A CHROMATIC POINT SENSOR

(75) Inventors: Casey Edward Emtman, Kirkland, WA (US); Yong Xie, Redmond, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 422 days.

(21) Appl. No.: 12/869,687

(22) Filed: Aug. 26, 2010

(65) Prior Publication Data

US 2012/0050722 A1   Mar. 1, 2012

(51) Int. Cl.
G01N 21/55 (2006.01)
(52) U.S. Cl.
USPC ........................................................ 356/445
(58) Field of Classification Search
None
See application file for complete search history.

(56) References Cited

U.S. PATENT DOCUMENTS

| | | | |
|---|---|---|---|
| 4,671,613 A | 6/1987 | Buhrer | |
| 5,165,063 A | 11/1992 | Strater | |
| 5,189,655 A * | 2/1993 | Ogata et al. | 369/44.23 |
| 5,239,178 A | 8/1993 | Derndinger | |
| 5,248,876 A | 9/1993 | Kerstens | |
| 5,737,084 A * | 4/1998 | Ishihara | 356/609 |
| 5,880,846 A | 3/1999 | Hasman | |
| 5,926,781 A | 7/1999 | Scott | |
| 6,369,951 B1 | 4/2002 | Spanner | |
| 6,555,811 B1 * | 4/2003 | Amos | 250/234 |
| 6,611,379 B2 | 8/2003 | Qian | |
| 6,636,310 B1 | 10/2003 | Ben-Dov | |
| 6,657,216 B1 * | 12/2003 | Poris | 250/559.22 |
| 6,917,421 B1 * | 7/2005 | Wihl et al. | 356/237.5 |
| 6,940,611 B2 * | 9/2005 | Babayoff et al. | 356/609 |
| 7,324,682 B2 | 1/2008 | Wasserman | |
| 7,369,225 B2 | 5/2008 | Messerschmidt | |
| 7,454,053 B2 | 11/2008 | Bryll | |
| 7,477,401 B2 | 1/2009 | Marx | |
| 7,626,705 B2 | 12/2009 | Altendorf | |
| 2005/0031191 A1 | 2/2005 | Venkatachalam | |
| 2007/0148792 A1 | 6/2007 | Marx | |
| 2008/0297795 A1 * | 12/2008 | Yonggang | 356/326 |
| 2009/0109285 A1 * | 4/2009 | Tobiason et al. | 348/79 |
| 2010/0128264 A1 * | 5/2010 | Hoenicka et al. | 356/300 |
| 2010/0208486 A1 | 8/2010 | Gladnick | |
| 2010/0283989 A1 * | 11/2010 | Sesko | 356/4.04 |

OTHER PUBLICATIONS

"PH10 Motorised Head Series," User's Guide for Renishaw Part No. H-1000-5070-11-B, Renishaw plc, Gloucester, United Kingdom, Apr. 2006, 67 pages.

(Continued)

*Primary Examiner* — Gregory J Toatley
*Assistant Examiner* — Juan D Valentin, II
(74) *Attorney, Agent, or Firm* — Christensen O'Connor Johnson Kindness PLLC

(57) ABSTRACT

A dual beam assembly is provided for attachment to a chromatic confocal point sensor optical pen. The optical pen provides a single source beam having a measurement range R in the absence of the dual beam assembly. The dual beam assembly includes a first reflective element that is positioned in the source beam and divides it into a first measurement beam and a second measurement beam. The dual beam assembly outputs the first and second measurement beams along first and second measurement axes to different workpiece regions and returns workpiece measurement light arising from the first and second measurement beams back to the optical pen. A second reflective element may be included and configured to deflect the second measurement beam along a desired direction. An offset may be provided between the measuring ranges of the first and second measurement beams.

24 Claims, 11 Drawing Sheets

OTHER PUBLICATIONS

Molesini, G., and F. Quercioli, "Pseudocolor Effects of Longitudinal Chromatic Aberration," Journal of Optics (Paris) 17(6):279-282, Nov. 1986.

"Optical Pens: Micrometric Measurement Range," Stil S.A., Aix-en-Provence, France, product brochure published on or before Mar. 6, 2007, 2 pages.

Sesko, D.W., "Dynamic Compensation of Chromatic Point Sensor Intensity Profile Data Selection," U.S. Appl. No. 11/940,214, filed Nov. 14, 2007.

Sesko, D.W., "Intensity Compensation for Interchangeable Chromatic Point Sensor Components," U.S. Appl. No. 12/463,936, filed May 11, 2009.

* cited by examiner

MULTIPLE MEASURING POINT CONFIGURATION FOR A CHROMATIC POINT SENSOR

FIELD OF THE INVENTION

The invention relates generally to precision measurement instruments, and more particularly to a configuration for a chromatic point sensor in which additional optical elements are utilized to achieve multiple measuring points and ranges.

BACKGROUND OF THE INVENTION

Controlled chromatic aberration techniques may be utilized for distance sensing metrology applications. As described in "Pseudocolor Effects of Longitudinal Chromatic Aberration," G. Molesini and S. Quercioli, J. Optics (Paris), 1986, Volume 17, No. 6, pages 279-282, controlled longitudinal chromatic aberration (also referred to herein as axial chromatic dispersion) may be introduced into an optical imaging system, causing the imaging system focal length to vary with wavelength, which provides means for optical metrology. In particular, a lens can be designed whose back focal length (BFL) is a monotonic function of wavelength. In white light operation such a lens exhibits a rainbow of axially dispersed foci that can be used as a spectral probe for distance sensing applications.

As a further example, U.S. Pat. No. 7,477,401, which is hereby incorporated herein by reference in its entirety, discloses that an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the axial distance or height of the surface determines which wavelength is best focused. Upon reflection from the surface, the light is refocused onto a small detector aperture, such as a pinhole and/or the end of an optical fiber. Upon reflection from a surface, only the wavelength that is well-focused on the surface is well-focused on the pinhole and/or fiber. All of the other wavelengths are poorly focused on the fiber, and so will not couple much power into the fiber. Therefore, the signal level will be greatest for the wavelength corresponding to the height of the object. A spectrometer at the detector measures the signal level for each wavelength, which effectively indicates the height of the object.

Certain manufacturers refer to a practical and compact optical assembly that is suitable for chromatic confocal ranging in an industrial setting as a chromatic confocal point sensor and/or as an "optical pen." One example of optical pen instruments that measure Z height are those manufactured by STIL, S.A. of Aix-en-Provence, France (STIL S.A.). As a specific example, the STIL optical pen model number OP 300NL measures Z heights and has a 300 micron range.

Another configuration for a chromatic confocal point sensor is described in commonly assigned U.S. Pat. No. 7,626,705 (the '705 patent) which is incorporated herein by reference in its entirety. The '705 patent discloses a lens configuration providing an improved optical throughput and an improved spot size which results in improved measurement resolution in comparison with various commercially available configurations.

For various applications, improvements in the operation of various aspects of currently available optical pens may be desirable (e.g., an ability to measure multiple points on different surfaces, and/or at different ranges, simultaneously, etc.) The present invention is directed to providing an improved chromatic point sensor in which additional optic elements are utilized for achieving multiple measuring points and ranges.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the invention, a dual beam assembly is provided which may be attached to the end of a chromatic confocal point sensor pen. The chromatic confocal point sensor pen otherwise provides a single source beam having a measurement range R in the absence of the dual beam assembly. In one embodiment, the dual beam assembly comprises a mounting element configured to be attached to the end of the chromatic confocal point sensor pen, and a first reflective element is attached to the mounting element. The first reflective element is positioned in the source beam from the optical pen (e.g., in the converging portion of the source beam that includes the chromatic aberration) and divides the source beam into a first measurement beam and a second measurement beam. The dual beam assembly outputs the first and second measurement beams along first and second measurement axes, and returns workpiece measurement light arising from the first and second measurement beams back to the chromatic confocal point sensor pen.

In accordance with another aspect of the invention, in one implementation the first reflective element may comprise a pattern of reflective regions and transmissive regions. In one embodiment, the reflective regions may comprise planar surface reflective minor regions, and the transmissive regions may comprise open holes. In one implementation, the pattern may be formed as an etched aperture pattern, where parts of the beam are transmitted through aperture holes (e.g., holes through thin material such as a silicon chip, or sheet metal, etc.) and some parts of the beam are reflected from the unetched material regions of the aperture diaphragm or plate. In certain embodiments, the use of such aperture techniques may be preferred over the use of beam splitter cubes, etc., which in certain implementations may introduce aberrations in the transmitted beams. In other embodiments, calibration techniques may be utilized to compensate for the effects of any aberrations caused by any transmissive elements (e.g., beam splitters, prismatic elements, etc.)

In accordance with another aspect of the invention, in some embodiments the reflective regions of the first reflective element have a total reflective area in the source beam and the transmissive regions have total transmissive area in the source beam, and the total reflective area may be within a specified percentage (e.g., +/−25%) of the total transmissive area. In certain embodiments, the total reflective area may have a specified difference (e.g., at least +/−5%) from the total transmissive area. In certain implementations, the pattern of the reflective and transmissive regions may be generally designed to have reflective symmetry across its center.

In accordance with another aspect of the invention, in some embodiments a second reflective element is included that is configured to deflect the second measurement beam along the second measurement axis. In one embodiment, the second reflective element comprises a planar first surface reflective mirror.

In accordance with another aspect of the invention, in one embodiment the dual beam assembly is configured such that planar reflective surfaces of the first and second reflective elements are parallel to one another. In another embodiment, the planar reflective surfaces of the first and second reflective elements are orthogonal to one another.

In accordance with an another aspect of the invention, in various embodiments the first and second measurement axes for the first and second measurement beams may be oriented in various configurations so as to achieve selected measurement operations. For example, the measurement axes may be oriented in the same direction as the optical axis of the optical pen, transverse (e.g., orthogonal) to the optical axis, transverse (e.g., orthogonal) to one another, coplanar, in opposite directions, etc.

It will be appreciated that a configuration where the first and second measurement beams are orthogonal to one another may be useful for various types of measurements (e.g., measuring a changing angle between two surfaces, measuring a surface roughness of a bottom and side wall simultaneously, etc.). It will also be appreciated that a configuration where the first and second measurement beams are directed along parallel measurement axes may also be useful for various types of measurements (e.g., measuring a step height, etc.). Advantages of this method as compared to the prior art include that common-mode surface waviness (e.g., due to cutting tool wander or vibration) does not affect a channel or step dimension measurement, that two measurements may be achieved from a single pen, and the pen and/or the measuring surface do not need to be moved laterally back and forth in order to provide a series of measurements along different axes or lines, which correspondingly provides for faster measurements and improved accuracy (i.e., vibrations, stage motions, etc., cancel out). In addition, the method allows two measurements over different measurement ranges, simultaneously, using a single optical pen. In addition, the dual beam assembly may be easily attached to conventional optical pens for providing the multiple measuring point functionality. Specific examples of implementations where a step height may be desired to be measured include a PCB track height, a silicon wafer layer thickness (i.e., for opaque layers), elements on an integrated circuit, etching, MEMS metrology, a groove along a straight edge, an O-ring groove, etc. For certain types of measurements (e.g., measurements of a groove along a straight edge or an O-ring groove), in one implementation the optical pen or the surface being measured may be moved relative to one another by a motorized attachment (e.g., moved linearly for a straight edge or rotated for an O-ring groove) so that a continuous measurement may be achieved along the length of the entire feature to be measured. In another implementation, the straightness or flatness of a stage may be measured. In addition, in certain implementations, the dynamic roll, pitch, or yaw of a stage may be measured. Without the dual beam assembly of the present invention, certain of these types of measurements have been performed in the prior art with interferometers and special optics which tend to be costly and bulky. The dual beam assembly of the present invention has advantages over such prior art interferometer configurations in that it is easier to set up, is less expensive (i.e., the optics are simpler), and occupies less space (i.e., the optics are smaller, etc.)

In accordance with another aspect of the invention, in some embodiments the mounting element may include at least one external alignment surface that is one of parallel to and orthogonal to one of the first and second measurement axes. In another embodiment, the mounting element includes an interface surface configured such that when it abuts an interface surface of the chromatic confocal point sensor pen, at least one of the first and second measurement axes is one of parallel to and orthogonal to an optical axis of the chromatic confocal point sensor pen.

In accordance with another aspect of the invention, in one embodiment the dual beam assembly includes an adjustable mount for positioning the first reflective element relative to the mounting element such that a reflecting plane of the first reflective element is adjustably positioned along an axis of the source beam. In another embodiment, the dual beam assembly includes an adjustable mounting arrangement for positioning the mounting element relative to the chromatic confocal point sensor pen such that a reflecting plane of the first reflective element is adjustably positioned along an axis of the source beam. In another embodiment, the dual beam assembly includes an adjustable mounting arrangement for positioning the second reflective element relative to the first mounting element such that a reflecting plane of the second reflective element is adjustably positioned along an axis of the second measuring beam. Such embodiments may be used to establish a relationship between two measuring ranges provided by the dual beam assembly.

In accordance with another aspect of the invention, in some embodiments a distance SEPP between the reflecting surfaces of the first and second reflecting elements along the second measurement beam is less than a maximum focus distance MF of the chromatic confocal point sensor pen. In one embodiment, the distance SEPP is less than the measurement range R. It will be appreciated that in the case where the separation SEPP is less than the measurement range R, then the system may be ideally designed for taking two measurements that fall within the range R (e.g., for two measurements on the same surface or for small steps). In another embodiment, the distance SEPP is at least the measurement range R. It will be appreciated that in the case where the separation distance SEPP is at least equal to the measurement range R, this allows the effective measurement range of the pen to essentially be extended beyond its normal range (e.g., for measuring a step height which is higher than the normal measurement range of the optical pen, etc.)

In accordance with another aspect of the invention, in some embodiments if the distance between two surfaces that are to be measured is more than the measurement range that is inherently provided by the optics of an optical pen (i.e., if the separation distance SEPP is equal to or greater than the measurement range R), then the dual beam assembly may be configured to provide an offset such that the first measurement beam provides a first measurement range over a first nominal standoff, and the second measurement beam provides a second nominal measurement range over a second nominal standoff. As specific numerical examples, if the general measurement range R of the optical pen were originally designed to cover only 50 microns, by adjusting the separation distance SEPP, the measurement range may be made to start at 50 microns (thus conservatively covering at least approximately a 50 to 100 microns step height range) or 100 microns (thus conservatively covering at least approximately a 100 to 150 microns step height range) or to 150 microns (thus conservatively covering at least approximately a 150 to 200 microns step height range), etc. It will be appreciated that such a configuration provides significant advantages over previous optical pens, where if it was desired to measure two surfaces (e.g., with a step height between the two surfaces) that were separated by a distance that was greater than the measurement range of the optical pen, then the physical position of the optical pen or the surfaces would need to be adjusted in the Z-direction every time it was desired to switch back and forth between measuring the two surfaces. In contrast, in accordance with the present invention, such measurements may be obtained simultaneously, without requiring additional movement of the optical pen in the Z-direction, through the use of a properly configured dual beam assembly. As a further significant advantage, if multiple measurement points are to be taken (e.g., measuring a step height at not only a single location but continuously at multiple measurement points along an edge), the optical pen or the workpiece being measured may be placed on a moveable member (e.g., a bearing, a stage, a rotational member, etc.) and moved so as to scan along the edge, so that the multiple continuous measurements can easily be obtained without requiring additional movement in the Z-direction.

In accordance with another aspect of the invention, in most applications it is generally desirable that the offset be set to be different than the Z-height difference between the two surfaces to be measured. More specifically, with regard to the distance along the detector measurement axis between the first and second spectral peaks corresponding to the first and second surfaces to be measured, it will be appreciated that if the offset distance is equivalent to the Z-height difference between the two surfaces, then the two spectral peaks would be approximately on top of one another. Therefore, for a given Z-height difference that is to be measured between two surfaces, it is generally desirable to configure the system so that the offset distance is different enough from the Z-height difference so that the spectral peaks for the two measurement heights can be differentiated to a desired degree. However, it will also be appreciated that in certain embodiments it is also desirable that the difference be small enough so that both of the spectral peaks fall within the desired range of the detector measurement axis, so that both can be measured on the same detector.

In accordance with another aspect of the invention, with regard to the amplitude of the signals relative to the spectral peaks, in certain implementations it is desirable to have both of the signals from the first and second measurement beams be as large as possible in order to achieve the highest throughput and highest speed measurements. In an alternative embodiment, if it is desired to be able to distinguish the first and second measurement beams from one another according to their amplitudes, in certain implementations one of the first or second measurement beams may intentionally be made to have less signal strength than the other, so that the beams can be further distinguished.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 1:
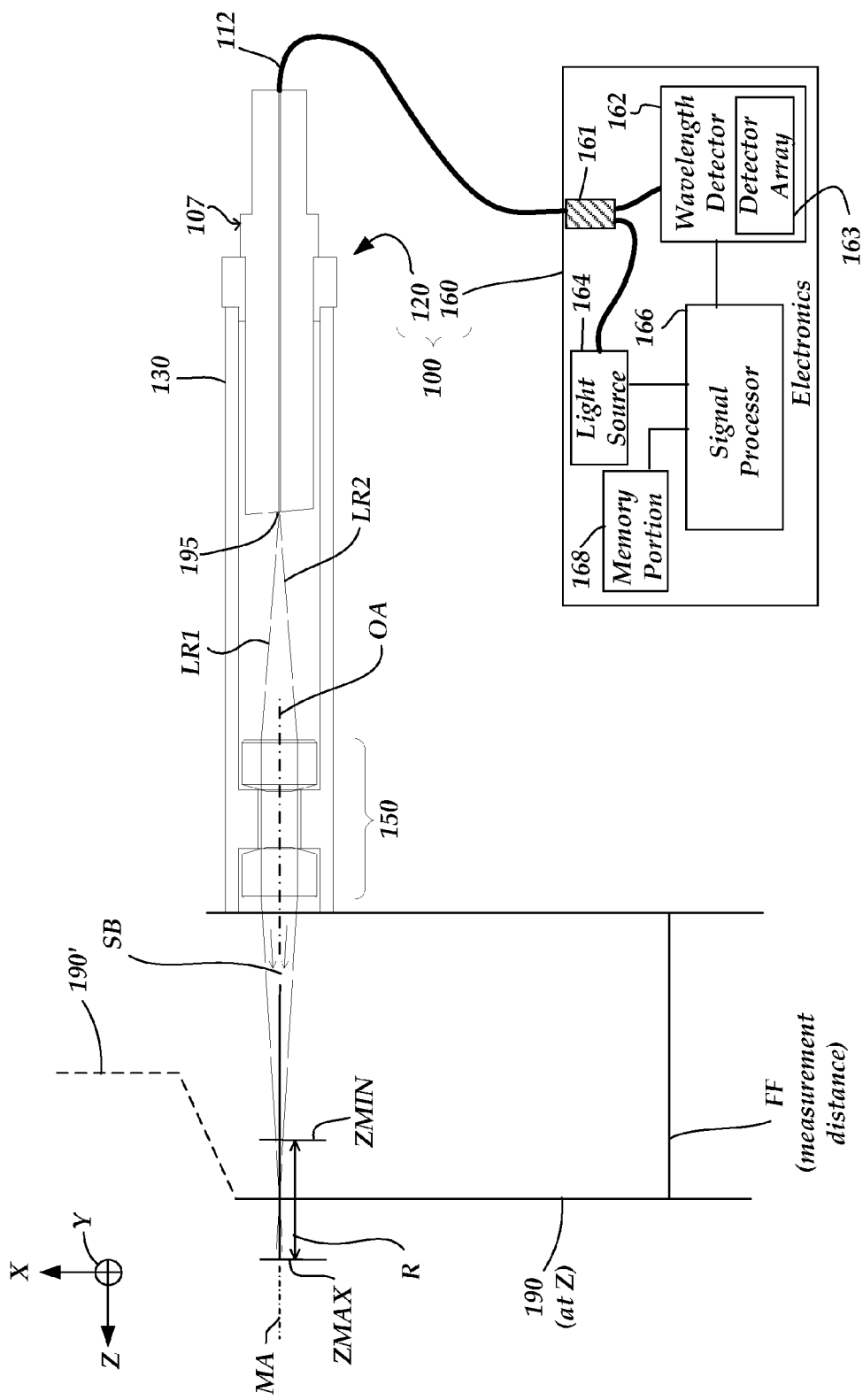
FIG. 1 is a block diagram of an exemplary chromatic confocal point sensor that produces a single measurement beam with a specified measurement range.

FIG. 1 is a block diagram of an exemplary chromatic confocal point sensor 100. The chromatic confocal point sensor 100 has certain similarities to sensors described in copending U.S. patent application Ser. No. 11/940,214 and U.S. patent application Ser. No. 12/463,936 (the '214 and '936 Applications, respectively) which are incorporated herein by reference in their entirety. As shown in FIG. 1, the chromatic confocal point sensor 100 includes an optical pen 120 and an electronics portion 160. The optical pen 120 includes a fiber optic connector 107, a housing 130, and an optics portion 150. The fiber optic connector 107 is attached to the end of the housing 130. The fiber optic connector 107 receives an in/out optical fiber (not shown in detail) through a fiber optic cable 112 which encases it. The in/out optical fiber outputs source light through a fiber aperture 195, and receives reflected measurement signal light through the fiber aperture 195.

In operation, broadband (e.g., white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive element (e.g., a grating) receives the reflected light through the optical fiber cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail below with respect to FIG. 3 and in the incorporated references. Briefly, a subpixel-resolution distance indicating coordinate of the profile data (e.g., a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data.

As will be described in more detail below, in accordance with the present invention, it may be desirable in some instances for the chromatic confocal point sensor 100 to not only be able to measure a distance to a first surface 190, but also to be able to measure a distance to a second surface 190'. For example, it may be desirable in some implementations to be able to measure a "step-height," or to otherwise be able to measure two surfaces. As illustrated in FIG. 1, in such instances, a second measurement surface 190' may be far enough away from the first measurement surface 190, so that the distance Zdiff between the two is outside of the normal measurement range of the optical pen 120. In other words, the optical pen 120 has a measurement range R that is bound by a minimum range distance ZMIN and a maximum range distance ZMAX, and in the position illustrated in FIG. 1, while the surface 190 falls in the middle of the measurement range R, the surface 190' falls outside of the measurement range. For example, the measurement range R in some example instances of known optical pens may be approximately $1/10^{th}$ of the nominal standoff or working distance from the end of the pen (e.g., in the range of tens of microns to a few millimeters). In applications which require a measurement of a step-height, or other implementations which require measurements of both of the surfaces 190 and 190', it may be desirable to be able to measure both of these surfaces from a single Z positioning of the optical pen 120. Even in instances where the surface 190' falls within the normal measurement range R of the optical pen 120, it may still be desirable in certain implementations to be able to measure the distances to both surfaces 190 and 190' without requiring further movement of the optical pen 120. As will be described in more detail below with respect to FIG. 2, in accordance with the present invention, a dual beam assembly is provided which can be attached to the end of an optical pen 120, which allows the measurements of two surfaces (e.g., surfaces 190 and 190') to be achieved over different measuring ranges, without requiring additional movement of the optical pen 120.

Figure 2:
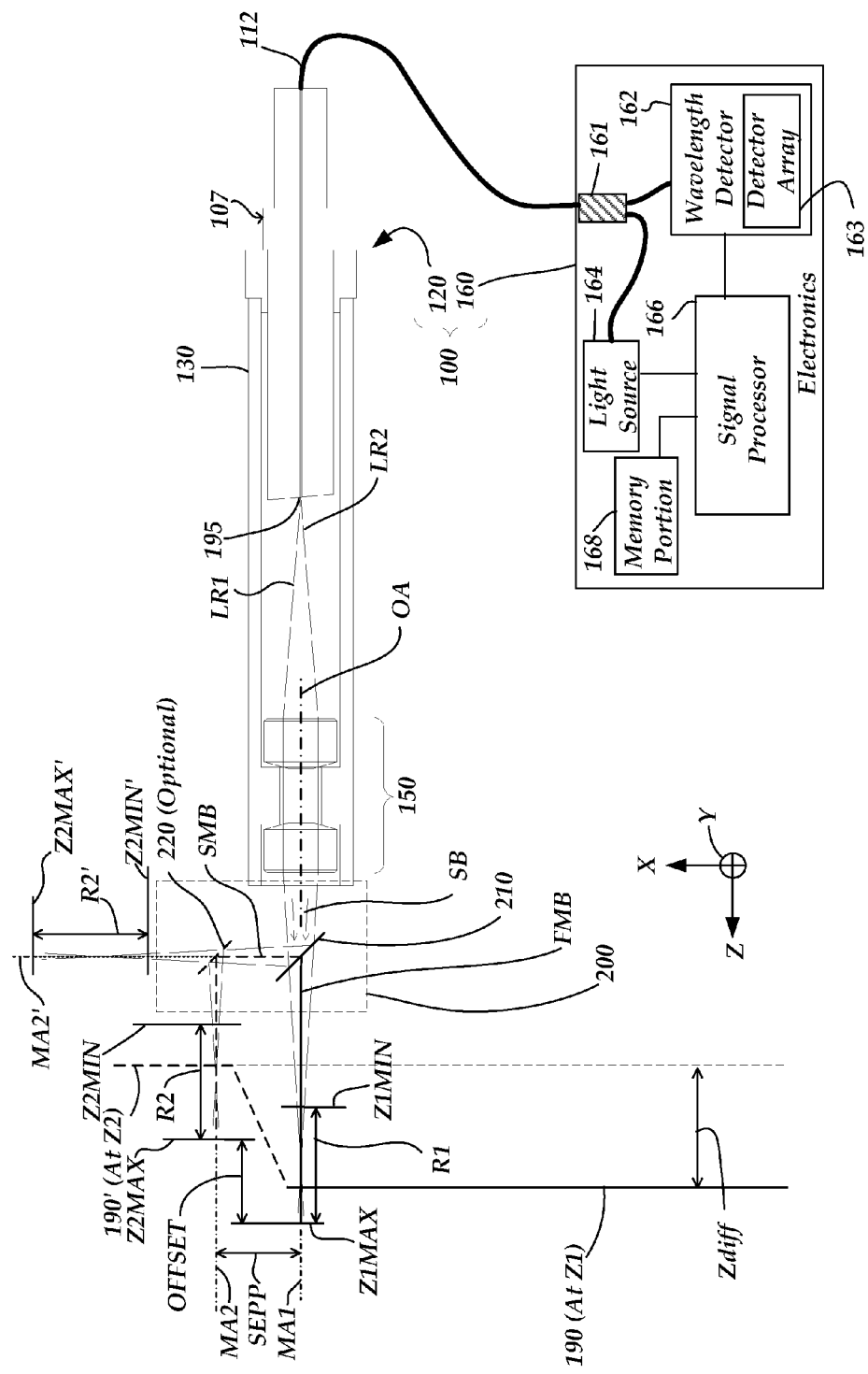
FIG. 2 is a block diagram of the chromatic confocal point sensor of FIG. 1 as further enhanced by a schematically represented dual beam assembly in accordance with the present invention that provides two measurement beams with two specified measurement ranges.

FIG. 2 is a block diagram of the chromatic confocal point sensor 100 of FIG. 1 with a schematically represented dual beam assembly 200 attached, in accordance with one embodiment of the present invention. As will be described in more detail below, the dual beam assembly 200 in one configuration outputs a first measurement beam FMB along a first measurement axis MA1 and a second measurement beam SMB along a second measurement axis MA2. As shown in FIG. 2, the dual beam assembly 200 includes a first reflective element 210 which is located in the path of the source beam SB of the optical pen 120. The first reflective element 210 effectively divides the source beam SB into two portions. More specifically, the first reflective element 210 transmits a first portion of the source beam SB as the first measurement beam FMB, and reflects a second portion of the source beam SB as the second measurement beam SMB. The dual beam assembly 200 may also include an optional second reflective element 220 which may reflect all or a portion of the second measurement beam SMB. In an embodiment with the second reflective element 220, the second measurement beam SMB may be reflected along the second measurement axis MA2 that is parallel to the first measurement axis MA1 of the first measurement beam FMB. A separation distance SEPP is shown between the measurement axes MA1 and MA2, which is also the distance between the first reflective element 210 and the second reflective element 220.

With regard to the operation of the optical pen 120 with the dual beam assembly 200 attached, for measurements achieved with the first measurement beam FMB, a measurement range R1 is shown to have a minimum range distance Z1MIN and a maximum range distance Z1MAX. In one embodiment, the range R1 and the distances Z1MIN and Z1MAX may correspond approximately to the range R and the distances ZMIN and ZMAX as illustrated in FIG. 1. As illustrated in FIG. 2, the surface 190 at the position Z1 falls in a central portion of the measurement range R1.

With regard to the second measurement beam SMB that is reflected by the second reflective element 220 along the second measurement axis MA2, a measurement range R2 is achieved. As shown in FIG. 2, the measurement range R2 has a minimum range distance Z2MIN and a maximum range distance Z2MAX. As shown in FIG. 2, the surface 190' at the position Z2 falls in a central portion of the measurement range R2. In addition, an offset distance OFFSET indicates the differential offset between the measurement ranges R1 and R2. As will be described in more detail below, various techniques may be utilized for adjusting the separation distance SEPP (e.g., utilizing fixed spacer elements of varying widths between the first and second reflective elements 210 and 220 and/or making the distances between or the locations of the first and second reflective elements 210 and 220 adjustable, etc.).

It may be appreciated that for the configuration shown in FIG. 2, the offset distance OFFSET is approximately or identically equal to the separation distance SEPP, and may thus be controlled or adjusted by the design or adjustment of the dual beam assembly 200. It will be appreciated that in one specific example embodiment an adjustable mount may be provided for positioning the first reflective element 210 relative to the optical pen 120 (e.g., along an axis of the source beam SB) so as to make the effective distances SEPP and OFFSET adjustable. This may also make the standoff of the ranges R1 and R2 adjustable relative to the dual beam assembly 200. With respect to FIG. 2, it will be appreciated that the effective positioning of the second measurement beam SMB and/or its nominal measuring range may be adjusted in at least two ways. As a first example, the first reflective element 210 may be moved along the direction of the first measuring beam FMB, which effectively changes the location along the first reflective element 210 where the second measurement beam SMB is reflected, and correspondingly slightly increases or lessens the distances between the end of the optical pen 120 and the position where the second measurement beam SMB is reflected upwards. As a second example, the second reflective element 220 may be moved along the direction of the second measuring beam SMB.

In various embodiments, it may be advantageous if the maximum and minimum distances of the measurement ranges (i.e., Z1MAX and Z1MIN for the measurement range R1 and Z2MAX and Z2MIN for the measurement range R2) are determined according to certain optical system constraints. Briefly, a first factor in determining the minimum and maximum of the measurement ranges is the physical distance that the specified set of lenses is able to focus a specified set of wavelengths over with a specified level of accuracy. More generally, each range with its minimum and maximum limits generally corresponds to the range that the available input spectrum can be well focused over by using chromatic aberration. In addition, the limitations of the detector itself are another factor in the ranges. In other words, for the different anticipated and desired wavelengths that are to be measured, it is desirable that the wavelengths be spread across the array of the detector so that a high level of resolution may be achieved. In summary, the ranges with the specified minimum and maximum distances are generally determined by limitations related to the ability to focus the spectrum effectively over a distance along the specified axis and by design choices related to the dispersion of the wavelengths on the detector.

It will be appreciated that through the utilization of the dual beam assembly 200 that multiple points may be measured with a single optical pen 120. In addition, different measurement ranges (e.g., measurement ranges R1 and R2 having an offset distance between them) may be associated with the different measurement beams, such that surfaces at different Z-locations may be effectively measured without requiring additional adjustment of the position of the optical pen 120 relative to the surfaces 190 and 190'.

As will be described in more detail below with respect to FIGS. 6, 8, 9, 10, and 11, in various embodiments, the first and second measurement axes MA1 and MA2 may be oriented in various directions relative to the optical 100 and/or relative to one another, so as to achieve desirable and measurement functions. For example, the measurement axes MA1 and MA2 may be oriented in the same direction as the optical axis OA of the optical pen 120, transverse (e.g., orthogonal) to the optical axis OA, coplanar, in opposite directions, transverse (e.g., orthogonal) to one another, etc. As an example of the measurement beams being orthogonal to one another, as illustrated in FIG. 2 in an embodiment where the second reflective element 220 is either not present, or else transmits a portion of the second measurement beam SMB, the second measurement beam SMB continues along an alternative second measurement axis MA2'. In this embodiment, a measurement range R2' is provided, with a minimum range distance Z2MIN' and maximum range distance Z2MAX'. As will be described in more detail below with respect to FIG. 9, such an implementation may be utilized where it is desired to have the second measurement beam SMB oriented in a direction that is effectively transverse (e.g., perpendicular) to that of the first measurement beam FMB (e.g., for measuring a changing angle between two surfaces, etc.).

Figure 3:
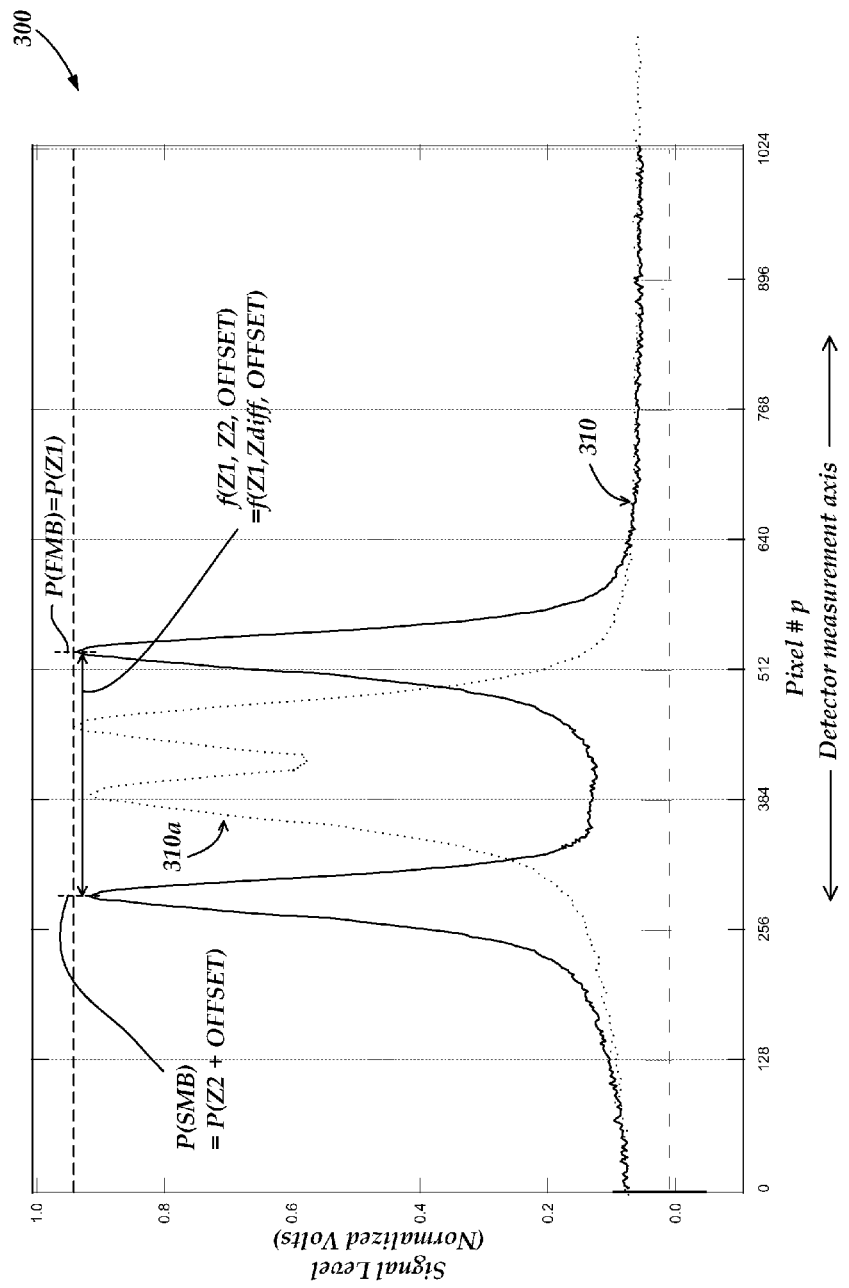
FIG. 3 is a diagram of spectral profile data from a chromatic confocal point sensor such as that of FIG. 2, illustrating two spectral peaks that are associated with the two measurement beams.

FIG. 3 is a diagram 300 of spectral profile data 310 from a chromatic confocal point sensor illustrating spectral peak data for two surface distances from an optical pen to which a dual beam assembly (e.g., the dual beam assembly 200) is attached according to the principles disclosed herein. Spectral data such as that shown in FIG. 3 is generally understood in the art, for example as described in the incorporated references. The profile data 310 shows a signal level associated with each pixel p (in normalized volts). The profile data 310 corresponds to measurements operations performed with the optical pen with the dual beam assembly attached (e.g., analogous to the chromatic confocal point sensor 100 and dual beam assembly 200 shown in FIG. 2).

The profile data 310 exhibits spectral peaks having peak position coordinates (i.e., $P(Z1)$ and $P(Z2+OFFSET)$), as will be described in more detail below. The peak position coordinates $P(Z1)$ and $P(Z2+OFFSET)$ may be determined with sub pixel resolution based on determining the peak of a curve fit to the peak regions of the profile data 310, or based on the centroid of peak regions of the profile data 310, or various other calibration and signal processing methods (e.g., as described in more detail in the incorporated references). As previously discussed with respect to FIG. 1, a measurement distance "Z" may be determined as the measurement distance that corresponds to the value of the peak position coordinate in the stored distance calibration data. In various embodiments, the stored distance calibration data may be interpolated to give a measurement distance precisely corresponding to the sub pixel peak position coordinate.

With regard to the relationship between the signals on the detector and the actual measurement surface locations or values Z1 and Z2, for determining the actual dimensions on the workpiece, in one embodiment the following conventions may be followed. The Z values are defined to be the absolute measurement locations or values along the Z direction. Thus, the values Z1 and Z2 in FIGS. 2 and 3, and in the following equations, are interpreted as measurement values (Z values) to be determined by the first measurement beam FMB or by the second measurement beam SMB. The measurement values Z1 and Z2 may be interpreted as values relative to a specified reference location (e.g., the end of the optical pen 120). Thus, in general, a specified standoff value, or offset value, which is related to the location of the reference point, may be added to the position within the measurement range.

In certain implementations, the measurement value Z1 may be regarded as the "more representative" of the two measurement values. That is, in the embodiment of FIG. 2, the measurement value Z1 is taken from the first measurement beam FMB which has not been deflected away from the measurement axis to a second reflective element. Thus, the measurement value Z1 has nominally the same value as if the dual beam assembly 200 is not present (e.g., such as illustrated in FIG. 1). More specifically, as illustrated in FIG. 2, the first measurement beam FMB which determines the measurement value Z1 is approximately composed of the same rays that are shown for the measurement beam (i.e., the unaltered source beam) for determining the measurement value Z in FIG. 1. Thus, in this particular instance, the measurement value Z1 determined from the first measurement beam FMB and the Z distance calibration curve that relates a spectral peak position coordinate to a corresponding Z distance should in general be the same with or without the dual beam assembly 200. In this case we may say that Z1 is essentially identical to the calibration curve Z value corresponding to the signal P(Z1) which arises from the first measurement beam FMB. This is, in general, not true for any second measurement beam which has undergone a second reflection to be turned in a different direction (e.g., the second measurement beam SMB), which has some separation dimension SEPP, and which therefore has an offset distance OFFSET along the Z axis direction, as will be discussed in more detail below.

Based on the principles above, and with reference to FIGS. 2 and 3, the following equations can be defined or derived:

$$Z1 = Zcal\ P(FMB) = P(Z1) \quad (Eq.\ 1)$$

$$Z2 = Zcal\ P(SMB) - OFFSET = Zcal\ P(Z2+OFFSET) - OFFSET \quad (Eq.\ 2)$$

With regard to EQUATION 2, it will be appreciated that before reaching the "absolute measurement position" Z2 along the Z axis direction, the second measurement beam SMB travels the extra dimension SEPP=OFFSET transverse to the Z axis direction in the deflected path that the second measurement beam SMB travels along, such that the resulting signal is as though it is measuring farther away from the pen than the position Z2 along the Z axis direction. Therefore, OFFSET must be subtracted from the apparent measurement distance indicated by the signal arising from the second measurement beam SMB, in order to determine the true distance Z2 along the Z axis direction.

In further regard to EQUATION 2, in one implementation the signals may be represented by the peak pixels, and thus in FIG. 3 the left hand peak P(SMB) corresponding to measurements from the second measurement beam SMB has also been labeled as P(Z2+OFFSET), and since Z1 may be regarded as being consistent with the value returned in the absence of the dual beam attachment (as described above), the peak P(FMB) associated with the first measurement beam FMB signal peak has also been labeled as P(Z1).

Thus, in one embodiment, the standard lookup table for the optical pen 120 may be used to determine the value Z1. With regard to the peak from the second measurement beam SMB, the value to be looked up corresponds to the sum (Z2+OFFSET). The offset value OFFSET may be known by design (e.g., from the separation distance SEPP) or by calibration (e.g., both beams directed toward a flat, perpendicular surface—with the difference set as OFFSET), such that the values for Z2 and Z1 can be determined based on the signals and the known OFFSET.

In FIG. 3, the separation between the peaks on the detector has been labeled as a function of f(Z1, Z2, and Offset), which alternatively could be written as a function of f(Z1, Zdiff, and Offset). The reason that the peak separation in terms of pixel location is a function of Z1 as well as Zdiff, is that the calibration for a given pixel to a given distance is nonlinear, such that a calibration needs to be provided with regard to a particular location on the nonlinear curve. In an alternative implementation where only a linear conversion was utilized, then the separation would depend only on the values Zdiff and OFFSET.

Based on the principles above, and with reference to FIGS. 2 and 3, when the step height Zdiff=Z1−Z2 is the same as OFFSET, the peaks P(FMB) and P(SMB) will be at the same location on the detector (that is, they will be indistinguishable on the curve 310). In light of these considerations, in various implementations it is desirable that the offset distance OFFSET be chosen or adjusted with reference to the expected range of the distance Zdiff=Z1−Z2, such that the peaks for P(FMB)=P(Z1) and (P(SMB)=P(Z2+OFFSET) do not coincide and can be differentiated. With regard to the ability to be able to differentiate the peaks, it may in certain implementations be desirable that they do not come closer than about 5-10% of the measurement range on the detector (e.g., an example of peaks with approximately a 70 pixel separation is shown in FIG. 3 as a dotted line representation of a set of spectral profile data 310a). For simplicity, this can be restated as requiring that the distance OFFSET be established such that (Zdiff−OFFSET)>0.05*R, or in a more conservative implementation that (Zdiff−OFFSET)>0.1R for all expected values of Zdiff.

Thus, in certain implementations it is desirable that the setup of the chromatic point sensor system 100 including the dual beam assembly 200 be configured according to the foregoing considerations. In particular, according to the foregoing, a total uninterrupted Z measurement range of the dual beam assembly and optical pen setup can be as much as R+Offset. However, if the distance OFFSET exceeds the measurement range R, then there will be a gap or interruption in the middle of the total measurement range where neither beam can obtain a valid measurement. Theoretically, an uninterrupted measurement range can approach N*R, where N is the number of beams. If it is acceptable to work with less signal, each beam can be split more times, and a range can be obtained approaching a large portion of the maximum focusing distance of the optical pen (e.g., similar to the standoff distance, which in one specific example implementation may be on the order of 10R). In a slightly more conservative estimation for such an implementation, a true working range of at least 8R may be achieved, with some degradation in S/N or sample rate due to the lower light intensity in each beam and the optical degradation in the multiple splitting operations.

Figure 4:
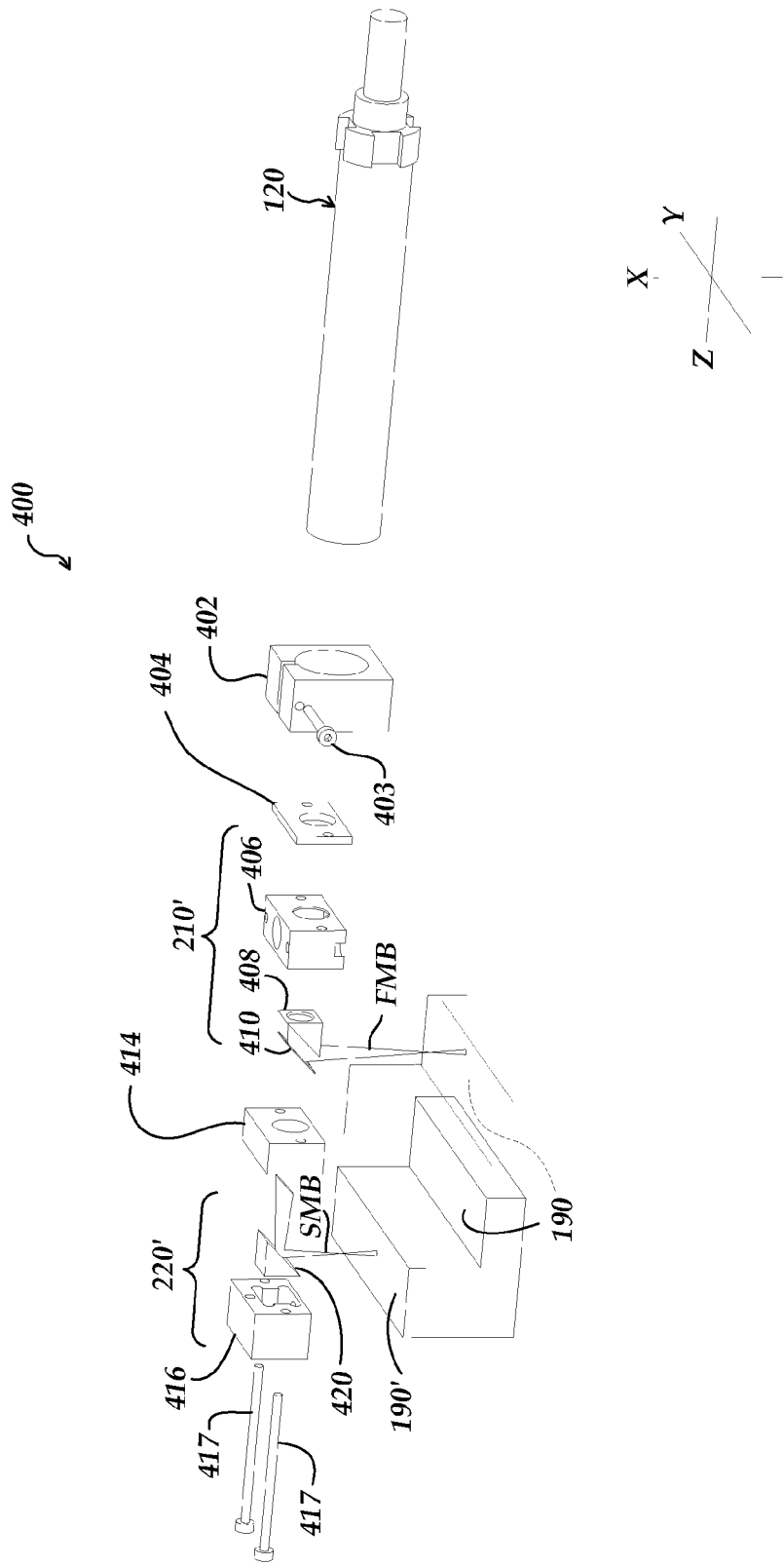
FIG. 4 is a diagram of an exploded view of a first exemplary embodiment of a dual beam assembly that is coupled to an optical pen.

FIG. 4 is a diagram of an exploded view of a first exemplary embodiment of a dual beam assembly 400 that is coupled to an optical pen 120. In FIG. 4, the same or analogous elements as those in the dual beam assembly 200 of FIG. 2 are noted with the same or similar reference numbers. The dual beam assembly 400 of FIG. 4 differs from the previously described schematically represented dual beam assembly 200, in that the first and second measurement beams FMB and SMB are both directed downward along measurement axes that are orthogonal to the optical axis of the optical pen 120.

Figure 6:
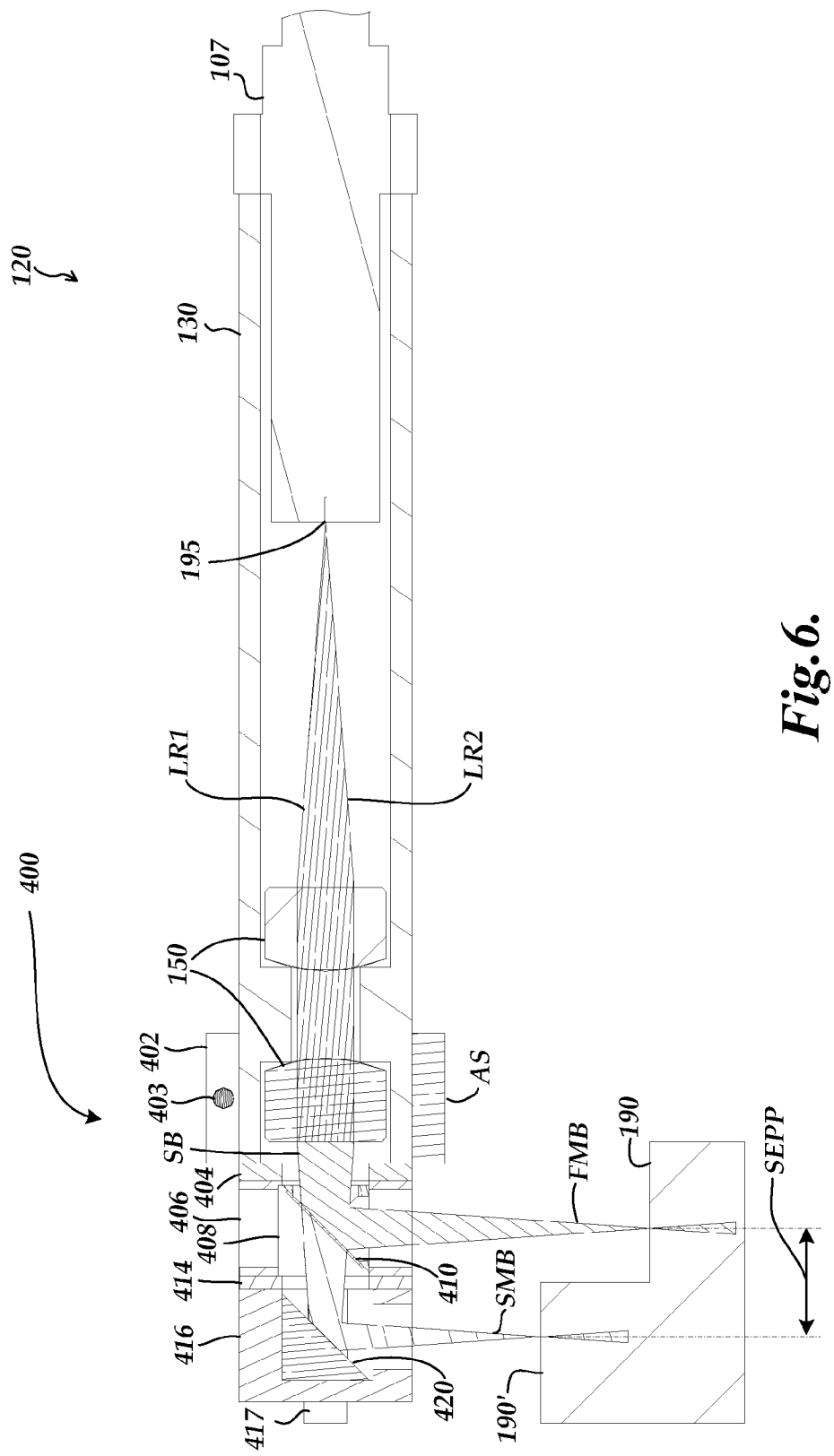
FIG. 6 is a diagram of a cross sectional side view of the dual beam assembly and optical pen of FIG. 4 in use.

As shown in FIG. 4, a mounting element 402 (e.g., a mounting collar with an upper slot, such that it may be constricted) is utilized for securely mounting the dual beam assembly 400 to the optical pen 120. A clamping bolt 403 is provided for constricting and compressing the mounting element 402 around the end of the optical pen 120. A first reflective element assembly 210' may be attached to the mounting element 402, and a second reflective element assembly 220' may be attached to the first reflective element assembly 210'. The first and second reflective element assemblies 210' and 220' may in certain embodiments comprise components similar to the first and second reflective elements 210 and 220 of FIG. 2. As shown in FIG. 4, the first reflective element assembly 210' may include a first reflective element holder 406, a first reflective element frame 408, and a first reflective element 410. A spacer element 404 may be provided to adjust the spacing of the first reflective element assembly 210' relative to the mounting element 402 and the optical pen 120. The second reflective element assembly 220' may include a second reflective element holder 416 and a second reflective element 420. A spacer element 414 may be provided to adjust the spacing of the second reflective element assembly 220' relative to first reflective element assembly 210', the mounting element 402 and the optical pen 120. As shown in FIG. 6, the spacer element 414 may be used to adjust the dimension SEPP (and therefore the value OFFSET, as outlined above). The spacer element 404 may be used to separately adjust the nominal standoff dimension or working distance.

As shown in FIG. 4, the spacer element 404 may adjustably separate the mounting element 402 and the first reflective element holder 406. The first reflective element holder 406 includes a precisely sized and aligned square opening for securely receiving the first reflective element frame 408 to which the first reflective element 410 is attached, as will also be described in more detail below with respect to FIG. 5. The spacer element 414 may adjustably separate the first reflective element holder 406 from the second reflective element holder 416. The second reflective element holder 416 includes a precisely sized and aligned square opening for securely receiving the second reflective element 420 (e.g., a first surface reflecting 45-45-90 prism), which may be bonded to it by adhesive or other bonding method. Assembly bolts 417 may be utilized through precise assembly holes to assemble the components of the dual beam assembly 400 in proper alignment.

During operation, the dual beam assembly 400 provides the first and second measurement beams FMB and SMB along measurement axes that are generally transverse or orthogonal to the original optical axis of the optical pen 120. The first measurement beam FMB is reflected downward (transverse to the optical pen optical axis) by the first reflective element 410, while the second measurement beam SMB is reflected downward (transverse to the optical pen optical axis) by the second reflective element 420. As will be described in more detail below with respect to FIG. 5, the first and second reflective element holders 406 and 416 are designed to securely hold and align the first and second reflective elements 410 and 420 so as to produce the proper alignment of the first and second measurement beams FMB and SMB.

Figure 5:
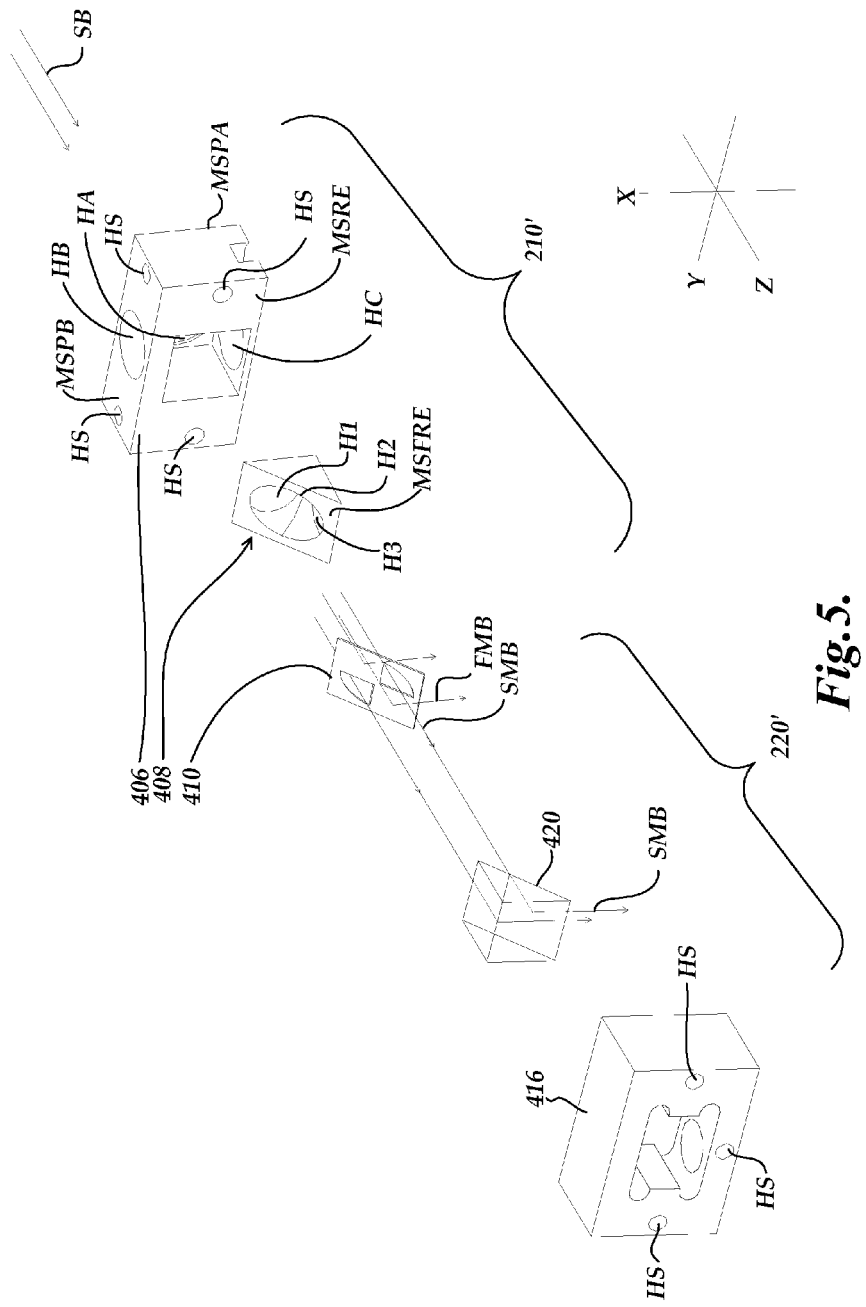
FIG. 5 is a diagram of an exploded view of selected components of the dual beam assembly of FIG. 4.

FIG. 5 is a diagram of an exploded view of selected components of the dual beam assembly 400 of FIG. 4. As shown in FIG. 5, the first reflective element holder 406 has a square hole that is precisely sized and aligned for receiving and aligning the first reflective element frame 408 to which the first reflective element 410 is attached. The first reflective element holder 406 also has designated mounting surfaces MSPA, MSPB and MSRE. The mounting surface MSPA may be mounted toward the optical pen 120 in a first configuration wherein the source beam SB passes through the hole HA and the first and second measurement beams FMB and SMB are intended to be directed along measurement axes that are orthogonal to the optical axis OA of the optical pen 120 (e.g., as will be described in more detail below with respect to FIG. 6). In an alternative configuration, the mounting surface MSPB may be mounted to be facing toward the optical pen 120, wherein the source beam SB passes through the hole HB and the first and second measurement beams FMB and SMB are intended to be directed along measurement axes that are in parallel with the optical axis OA of the optical pen 120 (e.g., as will be described in more detail below with respect to FIG. 8). The mounting surface MSRE generally faces toward the second reflective element 420 contained within the second reflective element holder 416, when it is present in a configuration. It will be appreciated that proper alignment of the mounting surfaces and assembly holes ensures proper alignment for producing the first and second measurement beams FMB and SMB in their correct orientations. This proper alignment is also ensured through careful construction of the first reflective element holder 406 for securely holding the first reflective element frame 408 to which the first reflective element 410 is attached, and the second reflective element holder 416 for securely holding the second reflective element 420.

The first reflective element holder 406 includes holes HA, HB, and HC, while the first reflective element frame 408 includes holes H1, H2, and H3, as well as a first reflective element mounting surface MSFRE. The first reflective element 410 is mounted to the first reflective element mounting surface MSFRE of the first reflective element frame 408 (e.g., by adhesive or other bonding method). In some embodiments, it is advantageous for the first and second measurement beams FMB and SMB to comprise rays that have not passed through any optical materials and/or potentially distortion-producing refractive interfaces in a dual beam assembly. Therefore, in the embodiments shown in FIGS. 4-10, the first reflective element is a patterned minor element including first-surface planar reflective mirror regions (e.g., material regions of a polished metal sheet) and transmissive regions that comprise open holes (e.g., holes through the polished metal sheet). The second reflective element (if present) may reflect all light in various embodiments. Therefore, the second reflective element may be provided by a first surface mirror of any convenient element (e.g., the prismatic element 420 shown in FIG. 5) in such embodiments.

As will be described in more detail below with respect to FIG. 6, in one configuration (i.e., wherein the mounting surface MSPA is mounted to be facing toward the optical pen 120), the holes HA and H1 receive the source beam from the optical pen 120, while a portion of the beam passes through the hole H2 and through the open sections of the first reflective element 410 as the second measurement beam SMB, and a portion is reflected downward through the holes H3 and HC as the first measurement beam FMB. As will be described in more detail below with respect to FIG. 8, in an alternative configuration (i.e., wherein the mounting surface MSPB is mounted to be facing toward the optical pen 120), the source beam from the optical pen 120 may be received through the hole HB, while a portion of the beam passes through the open sections of the first reflective element 410 and then through the holes H3 and HC as the first measurement beam FMB, and a portion is reflected by the reflective sections of the first reflective element 410 as the second measurement beam SMB.

FIG. 6 is a diagram of a cross sectional side view of the assembled dual beam assembly 400 and optical pen 120 of FIGS. 4 and 5 (e.g., as they would appear in use). As shown in FIG. 6, the mounting element 402 surrounds the end of the optical pen 120, and is clamped in place with the clamping bolt 403. The mounting element 402 may include an external alignment surface AS, which can rest on another surface for assisting with the proper measuring axis alignment and stability of the dual beam assembly 400 for measuring the distances to the surfaces 190 and 190'. In the embodiment of FIG. 6, the alignment surface AS is shown to be orthogonal to the measurement axes of the first and second measurement beams FMB and SMB. It will be appreciated that in alternative embodiments, other alignment surfaces may be provided on other portions of the mounting element 402, or on other elements (e.g., on the first or second reflective element holders 406 or 416, etc.).

The spacer element 404 is shown to provide a desired spacing distance between the mounting element 402 and first reflective element holder 406. As described above with respect to FIGS. 4 and 5, the first reflective element holder 406 holds the first reflective element frame 408 to which the first reflective element 410 is attached. Following the first reflective element holder 406, the spacer element 414 provides a desired spacing distance between the first reflective element holder 406 and the second reflective element holder 416 (e.g., to provide a desired dimension SEPP=OFFSET in some embodiments, as outlined previously). As described above with respect to FIGS. 4 and 5, the second reflective element holder 416 securely holds the second reflective element 420 in place in proper alignment. Assembly bolts 417 are used to properly align and assemble the components of the dual beam assembly 400.

During operation, light passing from the aperture 195 through the lenses 150 of the optical pen 120 travels as a source beam SB that continues to the first reflective element 410, a portion of which continues through open sections of the first reflective element 410 as the second measurement beam SMB which is reflected by the second reflective element 420 in a downward direction along a second measurement axis toward the surface 190'. A portion of the source beam is also reflected by the reflective sections of the first reflective element 410 as the first measurement beam FMB which travels downward along a first measurement axis toward the surface 190.

As described above with respect to FIGS. 2 and 3, various dimensions such as the separation distance SEPP and the offset distance OFFSET may be chosen or adjusted with due regard to expected workpiece dimensions, in order to produce spectral peaks in desired locations or with a desired minimum separation along the detector measurement axis (e.g., as outlined with reference to FIG. 3). Thus, it will be appreciated that the spacer elements 404 and 414 as illustrated in FIG. 6 may be selected to have a desired thickness for these purposes. As shown in FIG. 6, the spacer element 414 determines both the physical separation and the corresponding measurement range offset of the first and second measurement beams FMB and SMB. As described above with respect to FIG. 3, it is desirable that the offset be large enough so that the spectral peaks can be distinguished, but small enough so that both of the spectral peaks fall within a desirable measurement range of the detector. As also shown in FIG. 6, the spacer element 404 determines an overall standoff dimension of working distance for the measurement beams relative to the dual beam assembly 400. In various embodiments, the widths of the spacer elements 404 and 414 may be varied (e.g., by inserting a variable number of space elements, or spacer elements of different widths, etc.).

It will be appreciated that the configuration of FIG. 6, wherein the first and second measurement beams FMB and SMB are directed toward the surfaces 190 and 190', respectively, allows for the step height between the surfaces 190 and 190' to be measured as the dimension Zdiff (e.g., as illustrated in FIG. 2 and as described above). Advantages of this method as compared to the prior art include that two measurements may be achieved from a single optical pen 120, that Zdiff may exceed the normal measuring range R of an optical pen, and, nevertheless, the pen and/or the measuring surface do not need to be moved back and forth in order to provide the measurements, which correspondingly provides for faster measurements and improved accuracy (i.e., vibrations, stage motions, etc., cancel out). It will also be appreciated that a conventional optical pen can be easily converted for performing dual beam functionality, including dual measuring ranges or an extended measuring range, simply by attaching the mounting element 402 of the dual beam assembly 400.

Figure 7:
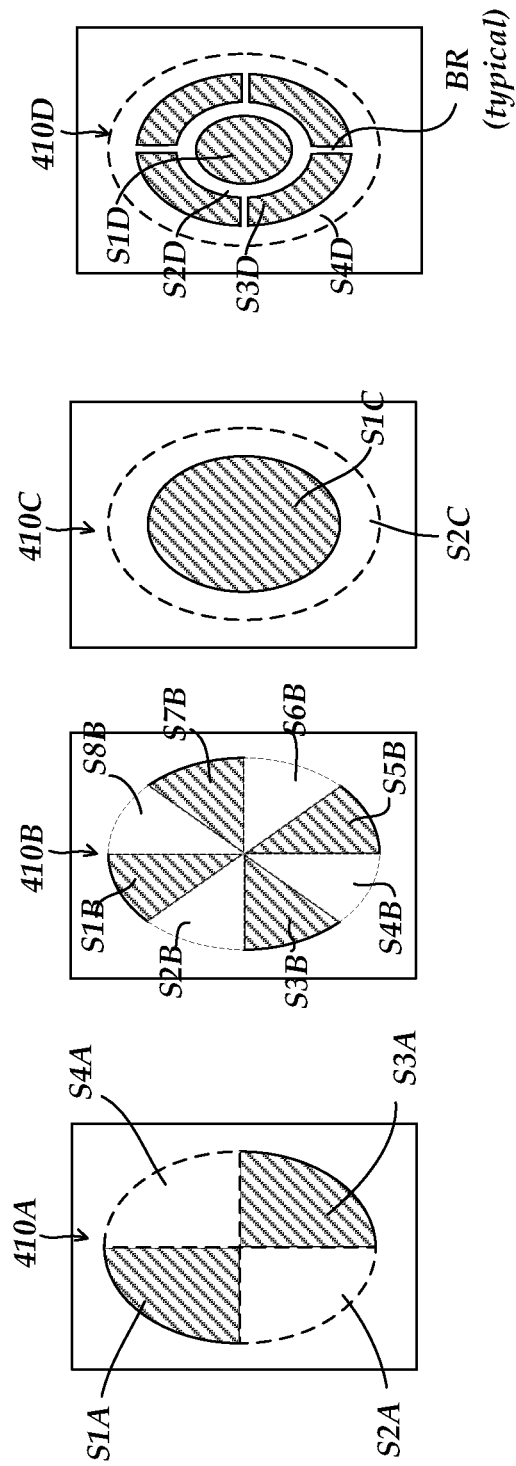
FIG. 7 is a diagram of patterns that may be utilized on the reflective surface of the first reflective element of FIG. 4.

FIG. 7 is a diagram of a series of reflective patterns 410A-410D that may be used in exemplary embodiments for the surface of the reflective element 410 of FIGS. 4-6. The patterns are defined within dashed line "limits" that correspond approximately to the illumination received by the pattern. As shown in FIG. 7, the patterns may be included within an extended area of a material sheet or thin film on glass (e.g., a rectangular sheet or film area, as shown), as previously outlined and described further below. As shown in FIG. 7, the reflective pattern 410A is divided into four sections S1A-S4A, with the first and third sections S1A and S3A being open (or transmissive), and the second and fourth sections S2A and S4A being reflective. The pattern 410B is shown to be divided into eight sections S1B-S8B, with the sections S1B, S3B, S5B, and S7B being open, while the sections S2B, S4B, S6B, and S8B are reflective. In the pattern 410C, a middle circular section S1C is open, while an outer ring section S2C is reflective. In the pattern 410D, a central circular section S1D is open, and is surrounded by an inner circular section S2D that is reflective, which is surrounded by a circular section S3D that is open, which is further surrounded by an outer circular section S4D that is reflective. When the reflective pattern 410D is formed in a material sheet, the pattern may include minimal bridge sections BR to support the section S2D. The bridge sections BR may be omitted if the pattern is formed in thin film on glass, or the like.

As will be described in more detail below, all of the patterns 410A-410D are formed with a type of symmetry that is beneficial for the operation of the dual beam assembly 400. More specifically, it is desirable in certain implementations for the patterns to have a reflective symmetry across the pattern center, or stated another way, the pattern should look similar or identical if it is rotated 180 degrees about its center. As illustrated in the patterns 410A and 410B of FIG. 7, this may be achieved in one type of implementation by providing a pattern with an even number of open sections and an even number of reflective sections, wherein each open section has a corresponding open section symmetrically across the pattern center from it, and each reflective section has a corresponding reflective section symmetrically across the pattern center from it. This type of configuration is operable, in that with regard to the source beam from the optical pen 120, a light ray in the upper portion of the source beam will be returned in the lower portion of the optics in the measurement beam reflected from the workpiece surface. Similarly, a light ray from the lower portion of the source beam will be returned in the upper portion of the optics in the measurement beam reflected from the workpiece surface. Thus, for example, with respect to the pattern 410A, a portion of the source beam that travels through the open section S1A, will be reflected back from the surface being measured through the open section S3A. Similarly, a portion of the source beam that is reflected by the reflective section S2A will be reflected back from the surface being measured and reflected by the section S4A toward the optical pen 120 so as to provide the desired measurement information. Similarly, a source beam portion that travels through the open section S3A is reflected back through open section S1A, and a portion that is reflected from the fourth section S4A is reflected back to the second section S2A. It will be appreciated that similar operations occur for the pattern 410B for each of the eight symmetrical sections S1B-S8B.

With regard to the patterns 410C and 410D, it will be appreciated that a similar operational symmetry exists for the corresponding circular patterns. For example, a portion of the source beam that travels through an open area near one edge of the open section S1C will be reflected back through an area near an opposite edge of the open section S1C. Similarly, a portion of the source beam that is reflected by a reflective portion near one edge of the reflective section S2C will be reflected back from the measurement surface toward a reflective portion on an opposite edge of the reflective section S2C. It will be appreciated that similar operation occurs for each of the open and reflective sections of the circular pattern 410D.

In some embodiments, the reflective regions are designed to have a total reflective area in the source beam (within the dotted lines) and the transmissive regions have a total transmissive area in the source beam, and the total reflective area may be within a specified percentage (e.g., +/−25%) of the total transmissive area, such that the energy within the first and second measurement beams is at least partially balanced, and they both provide a desirable level of signal strength. In certain other embodiments, the total reflective area may have a specified difference (e.g., at least +/−5%) from the total transmissive area, such that the energy within the first and second measurement beams is detectably different, and their signals can be distinguished from one another based on their signal strengths (e.g., their peak heights) on the detector.

Figure 8:
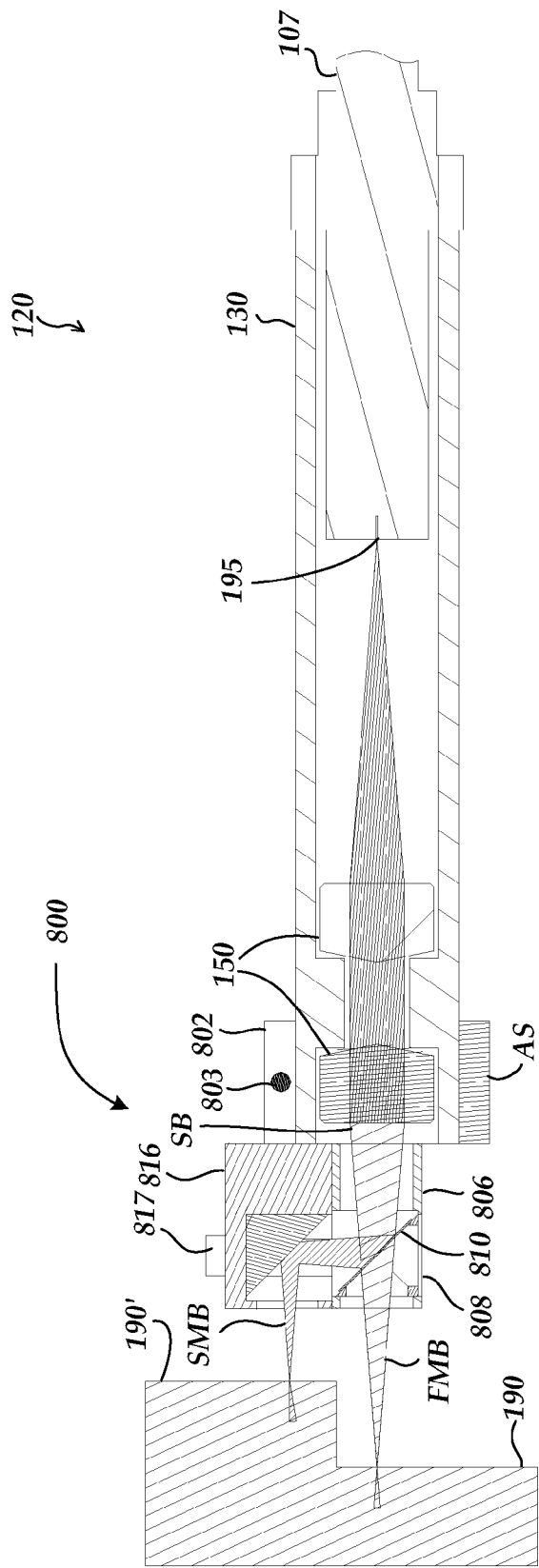
FIG. 8 is a diagram of a cross sectional side view of a second embodiment of a dual beam assembly that is coupled to an optical pen.

FIG. 8 is a diagram of a cross sectional side view of a second embodiment of a dual beam assembly 800 that is coupled to an optical pen 120. It will be appreciated that the components of the dual beam assembly 800 may be similar or identical to similarly numbered components of the dual beam assembly 400 of FIGS. 4-7. A primary difference of the dual beam assembly 800 is that the first measurement beam FMB and the second measurement beam SMB are both directed along measurement axes parallel to the optical axis OA of the optical pen 120.

As shown in FIG. 8, a mounting element 802 is utilized to attach the dual beam assembly 800 to the end of the optical pen 120, and is tightened with a clamping bolt 803. An external alignment surface AS on the mounting element 802 is shown to be parallel to the measurement axes of the first and second measurement beams FMB and SMB that are output by the dual beam assembly 800. The remaining components of the dual beam assembly 800 are generally at a 90 degree orientation relative to the comparable components of the dual beam assembly 400 of FIG. 6. More specifically, in the dual beam assembly 800, the first reflective element holder 806 is oriented below the second reflective element holder 816 (as compared to a left-right orientation of the first reflective element holder 406 and second reflective element holder 416 shown in FIG. 6).

The first reflective element holder 806 contains a first reflective element frame 808 to which a first reflective element 810 is attached. As described above with respect to FIG. 7, the first reflective element 810 may comprise a pattern with open and reflective sections. The second reflective element holder 816 contains a second reflective element 820. Assembly bolts 817 are provided for the assembly and proper alignment of the components of the dual beam assembly 800.

In operation, the source beam from the optical pen 120 is directed toward the first reflective element 810. Portions of the source beam that travel through the open sections of the first reflective element 810 continue as the first measurement beam FMB which is directed along a first measurement axis toward the surface 190. Portions of the source beam that are reflected by the reflective sections of the first reflective element 810 are directed toward the second reflective element 820 which then directs the second measurement beam SMB along a second measurement axis toward the surface 190'. It will be appreciated that the first and second measurement beams FMB and SMB are thus directed in parallel along the same direction as the optical axis OA of the optical pen 120.

In one embodiment, elements numbered with similar suffixes in FIGS. 8 and 4 may be similar or identical, and simply assembled in different orientations relative to one another using alternative mounting holes generally depicted in FIG. 4.

Figure 9:
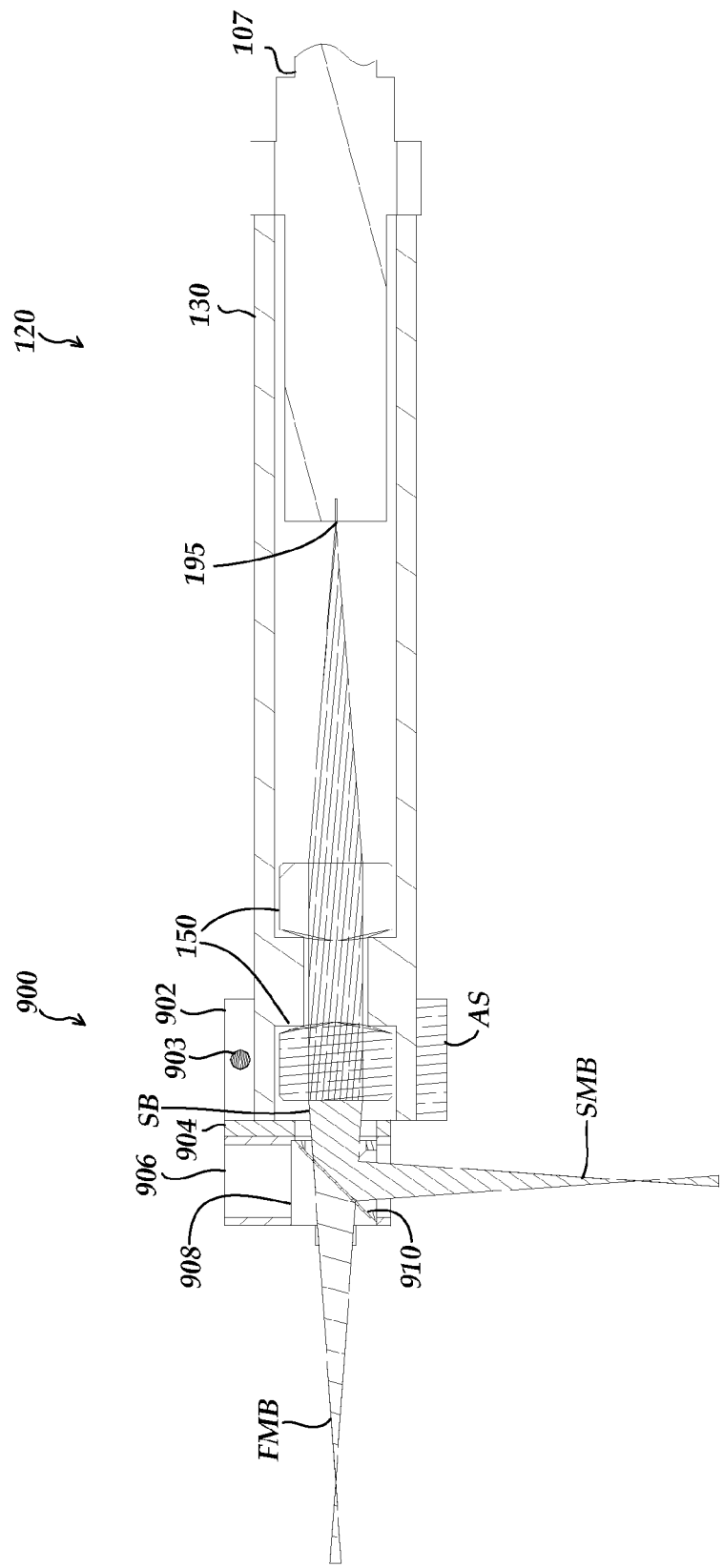
FIG. 9 is a diagram of a cross sectional side view of a third embodiment of a dual beam assembly that is coupled to an optical pen.

FIG. 9 is a diagram of a cross sectional side view of a third embodiment of a dual beam assembly 900 that is coupled to an optical pen 120. It will be appreciated that the components of the dual beam assembly 900 may be similar or identical to similarly numbered components of the dual beam assemblies 400 and 800 as described above. A primary difference of the dual beam assembly 900 is that the first measurement beam FMB is directed along a first measurement axis in the same direction as the optical axis of the optical pen 120, while the second measurement beam SMB is directed along a second measurement axis in a direction that is orthogonal to the optical axis of the optical pen 120.

As shown in FIG. 9, a mounting element 902 is utilized to attach the dual beam assembly 900 to the end of the optical pen 120, and is tightened by a clamping bolt 903. An external alignment surface AS of the mounting element 902 is shown to be parallel to the measurement axis of the first measurement beam FMB and orthogonal to the measurement axis of the second measurement beam SMB. A spacer element 904 provides a designated spacing between the mounting element 902 and a first reflective element holder 906. The first reflective element holder 906 contains a first reflective element frame 908 to which a first reflective element 910 is attached. As described above with respect to FIG. 7, the first reflective element 910 may comprise a pattern with open and reflective sections.

In operation, the source beam from the optical pen 120 is directed toward the first reflective element 910. Portions of the source beam that travel through the open sections of the first reflective element 910 continue as the first measurement beam FMB that travels along a first measurement axis. Portions of the source beam that are reflected by the reflective sections of the first reflective element 910 are directed downward as the second measurement beam SMB that travels along a second measurement axis. Thus, as illustrated in FIG. 9, the first and second measurement beams FMB and SMB are generally orthogonal relative to one another. It will be appreciated that such a configuration may be useful for measuring various types of surface configurations (e.g., measuring a changing angle between two surfaces, measuring a surface roughness of bottom and side walls simultaneously, etc.).

In one embodiment, elements numbered with similar suffixes in FIGS. 9 and 4 may be similar or identical, and some of the elements depicted in FIG. 4 may simply be omitted.

Figure 10:
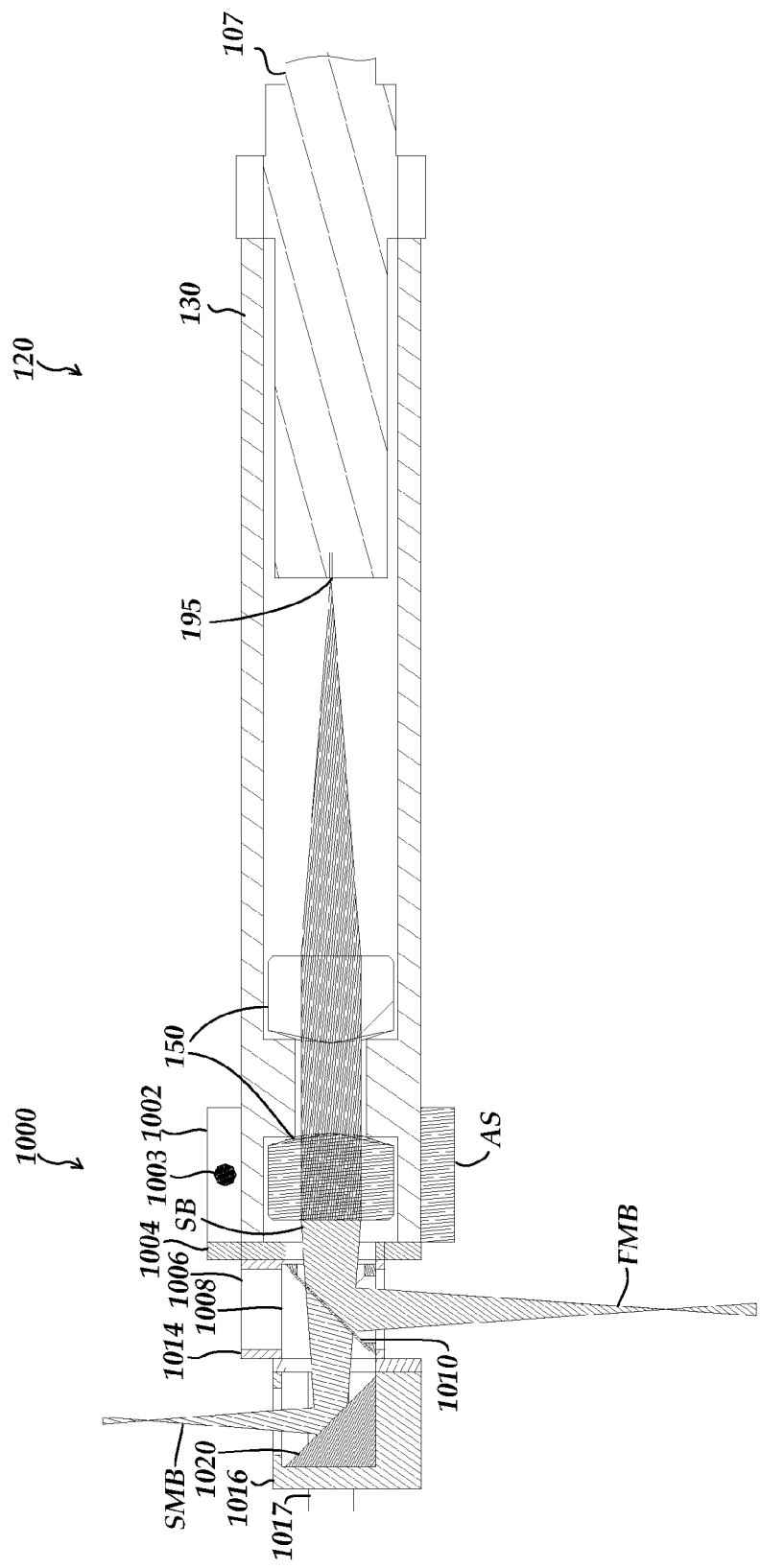
FIG. 10 is a diagram of a cross sectional side view of a fourth embodiment of a dual beam assembly that is coupled to an optical pen.

FIG. 10 is a diagram of a cross sectional side view of a fourth embodiment of a dual beam assembly 1000 that is coupled to an optical pen 120. It will be appreciated that the components of the dual beam assembly 1000 may be similar or identical to similarly numbered components of the dual beam assemblies 400, 800, and 900 as described above. A primary difference of the dual beam assembly 1000 is that the first measurement beam FMB is directed along a first measurement axis in an upward direction that is orthogonal to the optical axis OA of the optical pen 120, while the second measurement SMB is directed in a downward direction along a second measurement axis in a direction that is opposite to the direction of the first measurement beam FMB.

As shown in FIG. 10, a mounting element 1002 is utilized to attach the dual beam assembly 1000 to the end of the optical pen 120, and is tightened by a clamping bolt 1003. An external alignment surface AS of the mounting element 1002 is shown to be orthogonal to the measurement axes of the first and second measurement beams FMB and SMB. A spacer element 1004 provides a designated spacing between the mounting element 1002 and a first reflective element holder 1006. The first reflective element holder 1006 contains a first reflective element frame 1008 to which a first reflective element 1010 is attached. As described above with respect to FIG. 7, the first reflective element 1010 may comprise a pattern with open and reflective sections.

Following the first reflective element holder 1006, a spacer element 1014 provides a designated spacing between the first reflective element holder 1006 and a second reflective element holder 1016. The second reflective element holder 1016 contains a second reflective element 1020. Assembly bolts 1017 are provided for the alignment and assembly of the components of dual beam assembly 1000.

In operation, the source beam SB from the optical pen 120 is directed toward the first reflective element 1010. The portions of the source beam that are reflected downward by the reflective sections of the first reflective element 1010 continue in a downward direction as the first measurement beam FMB that travels along a first measurement axis. The portions of the source beam SB that pass through the open sections of the first reflective element 1010 are reflected by the second reflective element 1020 so as to be directed in an upward direction as the second measurement beam SMB that travels along a second measurement axis. It will be appreciated that the orientations of the first and second measurement beams in opposite directions can be utilized for obtaining various types of measurements (e.g., measuring the width of a gap, etc.).

In one embodiment, elements numbered with similar suffixes in FIGS. 10 and 4 may be similar or identical, and simply assembled in different orientations relative to one another using alternative mounting holes generally depicted in FIG. 4. For example, the components of the dual beam assembly 1000 can be seen to be virtually identical to those of the dual beam assembly 400 as illustrated in FIG. 6, with the exception that the second reflective element holder 1016 has been rotated 180 degrees. It will be appreciated that by constructing a dual beam assembly so that the components can be rotated and/or adjusted, that different dual beam assembly configurations may be achieved with a set of single dual beam assembly parts.

Figure 11:
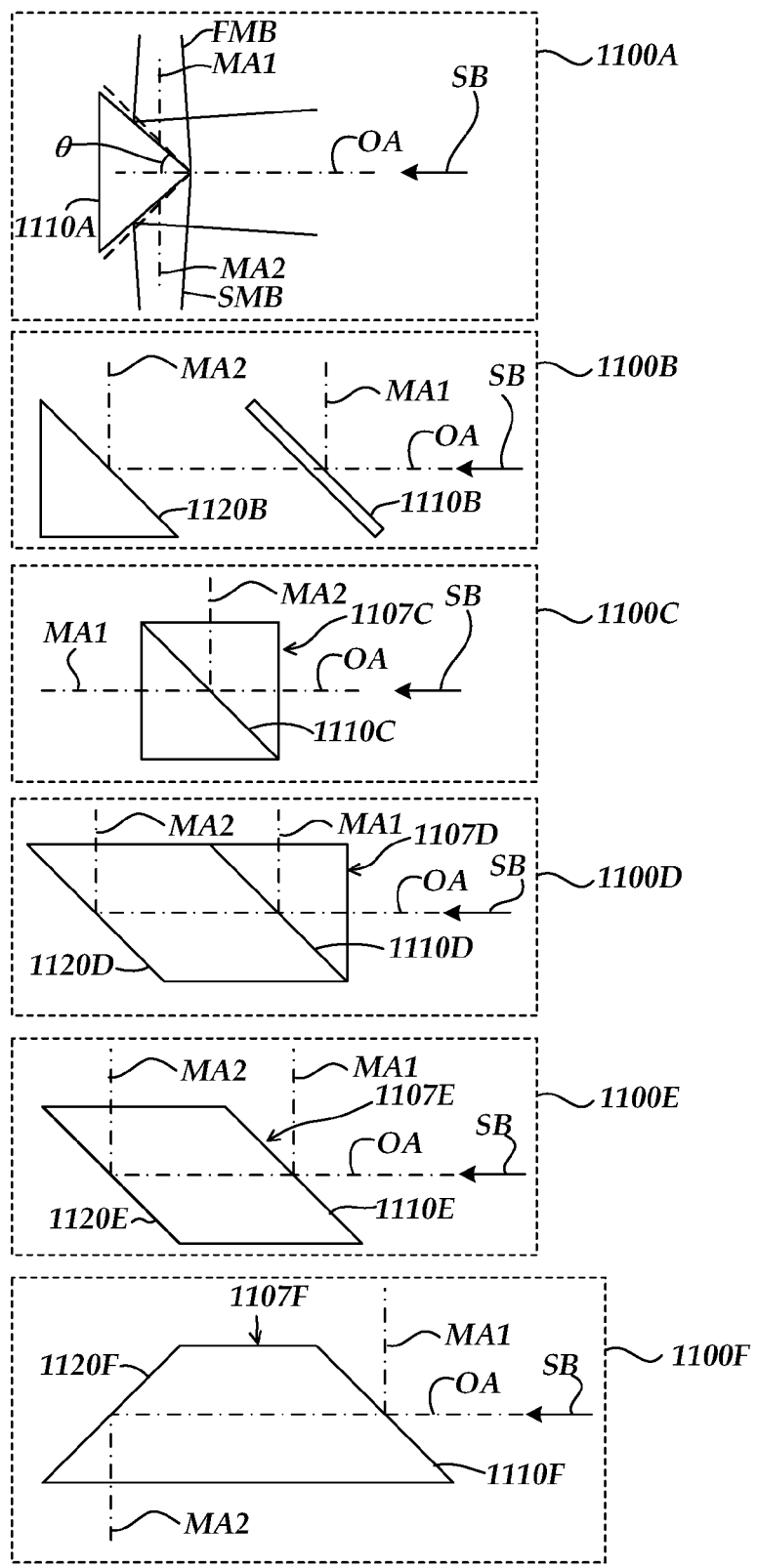
FIG. 11 is a diagram schematically illustrating alternative reflective element configurations that may be provided in various forms for use in a dual beam assembly.

FIG. 11 is a diagram illustrating exemplary reflective element configurations 1100A-1100F that may be provided in various forms (e.g., utilizing prismatic block elements or assemblies) for use in a dual beam assembly. As will be described in more detail below, the reflective element configurations 1100A-1100F may produce certain orientations of the first and second measurement beams FMB and SMB that are similar to those of the previously described dual beam assemblies 600, 800, 900, and 1000. It will be understood that in some embodiments the source beam SB may be reflected by a pattern corresponding to the principles outlined with reference to FIG. 7 at the first reflective element surface, which may be formed as a thin film pattern on a prismatic block, for example. Alternatively, in some embodiments, the source beam SB may be reflected by a half-silvered minor surface, or the like at the first reflective element surface. However, while this may be economical, it will result in lost or wasted light when the measurement beams return through that surface. In embodiments where a second reflective element surface deflects the second measurement beam along the measuring axis MA2, that surface may completely mirror surface. When utilizing prismatic block elements, it will be appreciated that certain levels of distortion may be introduced into the first and second measurement beams FMB and SMB by the prismatic elements, however even in such cases operable devices may still result, and in certain implementations any levels of distortion may be addressed through calibration techniques, as are known in the art.

As shown in FIG. 11, in this particular configuration, the reflective element configuration 1100A includes a triangular prismatic element 1110A that has complete reflective mirror surfaces on both sides. The reflective element 1110A divides a source beam SB that travels along an optical axis OA into a first measurement beam FMB that is directed upward along a first measurement axis MA1, and a second measurement beam SMB that is directed downward along a second measurement axis MA2. It will be appreciated that such a configuration may provide an alternative to the dual beam assembly 1000 of FIG. 10, which as described above also directs the first and second measurement beams FMB and SMB in opposite directions.

In certain implementations, it may be desirable that the sides of the triangular prismatic element 1110A be oriented at an angle theta that is less than 45 degrees. This may be desirable in that each side of the element 1110A receives half of the converging source beam SB. In other words, if it is desired to have all of the converging source beam SB imaged back through the device, the surfaces of the triangular prismatic element 1110A need to be tilted in order to take into account the convergence and the fact that half of the convergence is involved on each side. Thus, in one specific example embodiment, the angle theta deviates from 45 degrees by about half the numerical aperture (NA.) By properly determining the angle theta, the first and second measurement beams FMB and SMB, after being reflected back from the respective surfaces 190 and 190', return crossed over and having approximately the same configuration that was present when the beams were divided. In this manner, similar beams are reflected back along their original lines back into the optical pen 120, so that accurate measurements can be achieved.

As further shown in FIG. 11, the next reflective element configuration 1100B includes a first reflective element 1110B and a second reflective element 1120B. The first reflective element 1110B may be a partially reflective, partially transmissive sheet (i.e., as are known in optics) so that a portion of a source beam provided along an optical axis OA may be reflected upwards as a first measurement beam along a first measurement axis MA1. In addition, a portion of the source beam may also be transmitted to the second reflective element 1120B and reflected upwards as the second measurement beam along a second measurement axis MA2. It will be appreciated that this configuration provides an orientation of the first and second measurement beams along the first and second measurement axes MA1 and MA2 that is similar to that of the dual beam assembly 400 as illustrated in FIG. 6.

The next reflective element configuration 1100C includes a beam splitter 1107C. The beam splitter 1107C transmits a portion of a source beam that travels along an optical axis OA as a first measurement beam along a first measurement axis MA1. The beam splitter 1107C also reflects at an internal reflective surface 1110C a portion of the source beam upwards as a second measurement beam along a second measurement axis MA2. It will be appreciated that the output of the first and second measurement beams along the first and second measurement axes MA1 and MA2 in these orientations is similar to that of the dual beam assembly 900 as illustrated in FIG. 9.

The next reflective element configuration 1100D includes a prismatic element 1107D. At a first internal surface 1110D of the prismatic element 1107D, a portion of a source beam traveling along an optical axis OA is reflected upwards as a first measurement beam along a first measurement axis MA1. In addition, a remaining portion of the source beam is transmitted through the internal surface 1110D to a second surface 1120D of the element 1107D, where it is reflected upwards as a second measurement beam along a second measurement axis MA2. It will be appreciated that this configuration produces an orientation for the first and second measurement beams along the first and second measurement axes MA1 and MA2 that is similar to that of the dual beam assembly 400 as illustrated in FIG. 6.

The next reflective element configuration 1100E includes a rhombus shaped prismatic element 1107E. At a first surface 1110E of the prismatic element 1107E, a source beam directed along an optical axis OA is partially reflected upwards as a first measurement beam along a first measurement axis MA1. In addition, a remaining portion of the source beam is transmitted through the first surface 1110E to a second surface 1120E of the element 1107E, where it is reflected upwards as a second measurement beam along a second measurement axis MA2. It will be appreciated that this configuration also directs the first and second measurement beams along the first and second measurement axes MA1 and MA2 in an orientation that is similar to that of the dual beam assembly 400 as illustrated in FIG. 6.

The next reflective element configuration 1100F includes a trapezoidal prismatic element 1107F. At a first surface 1110F of the trapezoidal prismatic element 1107F, a portion of a source beam provided along an optical axis OA is reflected upward as a first measurement beam along a first measurement axis MA1. In addition, the first surface 1110F also transmits a portion of the source beam to a second surface 1120F of the element 1107F where it is reflected downward as a second measurement beam along a second measurement axis MA2. It will be appreciated that this configuration directs the first and second measurement beams along the first and second measurement axes MA1 and MA2 in an orientation that is similar to that of the dual beam assembly 1000 as illustrated in FIG. 10.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A dual beam assembly to be attached to a chromatic confocal point sensor pen which provides a single source beam having a measurement range R in the absence of the dual beam assembly, the dual beam assembly comprising:
a mounting element configured to be attached to the chromatic confocal point sensor pen; and
a first reflective element,
wherein:
the dual beam assembly is configured such that when the mounting element is operably attached to the chromatic confocal point sensor pen:
the first reflective element is positioned in the source beam and divides the source beam into a first measurement beam and a second measurement beam; and
the dual beam assembly outputs the first and second measurement beams to different workpiece portions along first and second measurement axes, and returns workpiece measurement light arising from the first and second measurement beams back to the chromatic confocal point sensor pen: and
the first reflective element comprises one of:
a pattern of reflective regions and transmissive regions that divides the source beam; and
a prismatic element which includes at least one partially reflective and partially transmissive surface that divides the source beam.

2. The dual beam assembly of claim 1, wherein the reflective regions comprise planar surface reflective mirror regions, and the transmissive regions are open holes.

3. The dual beam assembly of claim 1, wherein the reflective regions have a total reflective area in the source beam and the transmissive regions have total transmissive area in the source beam, and the total reflective area is within +/−25% of the total transmissive area.

4. The dual beam assembly of claim 1, wherein the pattern of the first reflective element has reflective symmetry across its center.

5. The dual beam assembly of claim 1, further comprising a second reflective element configured to deflect the second measurement beam along the second measurement axis.

6. The dual beam assembly of claim 5, wherein the second reflective element comprises a planar first surface reflective mirror.

7. The dual beam assembly of claim 5, wherein:
the first reflective element includes a first planar reflective surface that is configured to divide the source beam and the second reflective element comprises a second planar reflective surface that is configured to deflect the second measurement beam; and
the dual beam assembly is configured such that the planar reflective surfaces of the first and second reflective elements are parallel to one another.

8. The dual beam assembly of claim 5, wherein:
the first reflective element includes a first planar reflective surface that is configured to divide the source beam and the second reflective element comprises a second planar reflective surface that is configured to deflect the second measurement beam; and
the dual beam assembly is configured such that the planar reflective surfaces of the first and second reflective elements are orthogonal to one another and arranged such that the first and second measurement axes are parallel to one another and facing in opposite directions.

9. The dual beam assembly of claim 8, wherein the dual beam assembly is configured such that the first measurement axis is perpendicular to an optical axis of the chromatic confocal point sensor pen and the second measurement axis is parallel to the first measurement axis.

10. The dual beam assembly of claim 5, wherein the dual beam assembly is configured such that the first and second measurement axes are transverse to an optical axis of the chromatic confocal point sensor pen.

11. The dual beam assembly of claim 1, wherein the mounting element includes at least one external alignment surface that is one of parallel to and orthogonal to one of the first and second measurement axes.

12. The dual beam assembly of claim 1, wherein the mounting element includes an interface surface configured such that when it abuts an interface surface of the chromatic confocal point sensor pen, at least one of the first and second measurement axes is one of parallel to and orthogonal to an optical axis of the chromatic confocal point sensor pen.

13. The dual beam assembly of claim 1, wherein the second measurement axis is transverse to the first measurement axis.

14. The dual beam assembly of claim 5, wherein:
the first reflective element includes a first planar reflective surface that is configured to divide the source beam and the second reflective element comprises a second planar reflective surface that is configured to deflect the second measurement beam; and
a distance SEPP between the reflecting surfaces of the first and second reflecting elements along the second measurement beam is less than a maximum focus distance MF of the chromatic confocal point sensor pen.

15. The dual beam assembly of claim 14, wherein the distance SEPP is less than the measurement range R.

16. The dual beam assembly of claim 14, wherein the distance SEPP is at least the measurement range R.

17. The dual beam assembly of claim 1, wherein the dual beam assembly comprises at least one of:
(a) an adjustable mount for positioning the first reflective element relative to the mounting element such that a reflecting plane of the first reflective element is adjustably positioned along an axis of the source beam; and
(b) an adjustable mounting arrangement for positioning the mounting element relative to the chromatic confocal point sensor pen such that a reflecting plane of the first reflective element is adjustably positioned along an axis of the source beam.

18. The dual beam assembly of claim 5, wherein the dual beam assembly comprises an adjustable mounting arrangement for positioning the second reflective element relative to the first mounting element such that a reflecting plane of the second reflective element is adjustably positioned along an axis of the second measurement beam.

19. The dual beam assembly of claim 1, wherein at least one of the dual beam assembly and the chromatic confocal point sensor pen further comprises a single confocal aperture which provides dual signals to a spectrometer.

20. The dual beam assembly of claim 1, wherein:
the first reflective element comprises a pattern of reflective regions and transmissive regions,
the reflective regions have a total reflective area in the source beam and the transmissive regions have total transmissive area in the source beam, and
the total reflective area has a difference of at least +/−5% from the total transmissive area.

21. The dual beam assembly of claim 1, wherein:
a fixed Z offset exists with respect to a measurement range R1 of the first measurement beam and a measurement range R2 of the second measurement beam,
the dual beam assembly is configured to be able to measure a nominal step height of a specified dimension, and
the difference between the fixed Z offset and the nominal step height is greater than 5% of the measurement range R.

22. The dual beam assembly of claim 1, wherein the first and second measurement axes are not coincident.

23. A dual beam assembly to be attached to a chromatic confocal point sensor pen that provides a single source beam having a measurement range R in the absence of the dual beam assembly, the dual beam assembly comprising:
a mounting element configured to be attached to the chromatic confocal point sensor pen; and
a first reflective element,
wherein the dual beam assembly is configured such that when the mounting element is operably attached to the chromatic confocal point sensor pen:
the first reflective element is positioned in the source beam and divides the source beam into a first measurement beam and a second measurement beam; and
the dual beam assembly outputs the first and second measurement beams to different workpiece portions along first and second measurement axes, and returns workpiece measurement light arising from the first and second measurement beams back to the chromatic confocal point sensor pen, and
wherein the second measurement axis is transverse to the first measurement axis.

24. A dual beam assembly to be attached to a chromatic confocal point sensor pen that provides a single source beam having a measurement range R in the absence of the dual beam assembly, the dual beam assembly comprising:
a mounting element configured to be attached to the chromatic confocal point sensor pen;
a first reflective element; and
a second reflective element,
wherein the dual beam assembly is configured such that when the mounting element is operably attached to the chromatic confocal point sensor pen:
the first reflective element is positioned in the source beam and divides the source beam into a first measurement beam and a second measurement beam; and
the dual beam assembly outputs the first and second measurement beams to different workpiece portions along first and second measurement axes, and returns workpiece measurement light arising from the first and second measurement beams back to the chromatic confocal point sensor pen,
wherein the second reflective element is configured to deflect the second measurement beam along the second measurement axis, and
wherein the dual beam assembly comprises an adjustable mounting arrangement for positioning the second reflective element relative to the first mounting element such that a reflecting plane of the second reflective element is adjustably positioned along an axis of the second measurement beam.

* * * * *

UNITED STATES PATENT AND TRADEMARK OFFICE
CERTIFICATE OF CORRECTION

Page 1 of 1

PATENT NO.         : 8,456,637 B2
APPLICATION NO.    : 12/869687
DATED              : June 4, 2013
INVENTOR(S)        : C. E. Emtman et al.

It is certified that error appears in the above-identified patent and that said Letters Patent is hereby corrected as shown below:

In the Claims:

| COLUMN | LINE | ERROR |
|---|---|---|
| 22 (Claim 1, | 2 line 20) | delete ":" and insert --;-- |

Signed and Sealed this
Fifteenth Day of July, 2014

Michelle K. Lee
*Deputy Director of the United States Patent and Trademark Office*